US009596077B2

(12) United States Patent
Johnson et al.

(10) Patent No.: US 9,596,077 B2
(45) Date of Patent: Mar. 14, 2017

(54) COMMUNITY OF INTEREST-BASED SECURED COMMUNICATIONS OVER IPSEC

(71) Applicants: Robert A Johnson, Malvern, PA (US); Kathleen Wild, Malvern, PA (US); Sarah K Inforzato, Malvern, PA (US); Ted Hinaman, Malvern, PA (US)

(72) Inventors: Robert A Johnson, Malvern, PA (US); Kathleen Wild, Malvern, PA (US); Sarah K Inforzato, Malvern, PA (US); Ted Hinaman, Malvern, PA (US)

(73) Assignee: Unisys Corporation, Blue Bell, PA (US)

(*) Notice: Subject to any disclaimer, the term of this patent is extended or adjusted under 35 U.S.C. 154(b) by 208 days.

(21) Appl. No.: 14/042,212

(22) Filed: Sep. 30, 2013

(65) Prior Publication Data
US 2015/0095649 A1 Apr. 2, 2015

(51) Int. Cl.
*H04L 29/06* (2006.01)
*H04L 9/08* (2006.01)
(Continued)

(52) U.S. Cl.
CPC ............ *H04L 9/0838* (2013.01); *G06F 21/00* (2013.01); *G06F 21/53* (2013.01); *H04L 9/0841* (2013.01);
(Continued)

(58) Field of Classification Search
CPC ... H04L 9/0838; H04L 9/0841; H04L 9/0816; H04L 9/0819; H04L 9/0822;
(Continued)

(56) References Cited

U.S. PATENT DOCUMENTS 6,266,420 B1 * 7/2001 Langford .............. H04L 9/0825
380/277
7,234,058 B1 * 6/2007 Baugher ............... H04L 9/0833
380/259

(Continued)

*Primary Examiner* — Tae Kim
(74) *Attorney, Agent, or Firm* — Robert P. Marley

(57) ABSTRACT

A method and system for establishing secure communications between endpoints includes transmitting a first message including a token having one or more entries each corresponding to a community of interest associated with a user of the first endpoint and including an encryption key and a validation key associated with the first endpoint. The method includes receiving a second message including a second authorization token including one or more entries, each entry corresponding to a community of interest associated with a second user and including an encryption key and a validation key associated with the second endpoint. The method includes, for each community of interest associated with both users, decrypting an associated entry in the second authorization token to obtain the encryption key and validation key associated with the second endpoint. The method also includes generating a shared secret based on the key pair, transmitting a third message including the created key pair to the second endpoint, and initializing tunnel using the shared secret to derive encryption keys used for IPsec-secured communications between the endpoints.

20 Claims, 19 Drawing Sheets

(51) Int. Cl.
*G06F 21/53* (2013.01)
*G06F 21/00* (2013.01)

(52) U.S. Cl.
CPC .......... *H04L 63/02* (2013.01); *H04L 63/0227* (2013.01); *H04L 63/0485* (2013.01); *H04L 69/18* (2013.01); *H04L 63/0236* (2013.01); *H04L 63/061* (2013.01); *H04L 63/164* (2013.01); *H04L 63/166* (2013.01); *H04L 63/205* (2013.01)

(58) Field of Classification Search
CPC ... H04L 9/0825; H04L 9/0833; H04L 63/061; H04L 63/065; H04L 63/067; H04L 63/0435; H04L 63/0428; H04L 63/0442; H04L 63/045
See application file for complete search history.

(56) References Cited

U.S. PATENT DOCUMENTS

| | | | | |
|---|---|---|---|---|
| 7,234,063 B1* | 6/2007 | Baugher | ............... | H04L 9/0833 380/259 |
| 7,328,342 B2* | 2/2008 | Albanese | ............... | H04N 7/163 348/E7.056 |
| 7,885,411 B2* | 2/2011 | Little | ............... | H04L 9/0841 380/277 |
| 7,900,250 B1* | 3/2011 | Fedyk | ............... | H04L 9/0833 380/30 |
| 8,295,484 B2* | 10/2012 | Buer | ............... | H04L 63/045 380/255 |
| 9,002,018 B2* | 4/2015 | Wilkins | ............... | H04L 9/006 380/281 |
| 2004/0153642 A1* | 8/2004 | Plotkin | ............... | G06F 21/85 713/150 |
| 2005/0027871 A1* | 2/2005 | Bradley | ............... | G06F 21/10 709/227 |
| 2005/0033964 A1* | 2/2005 | Albanese | ............... | H04N 7/163 713/171 |
| 2005/0149732 A1* | 7/2005 | Freeman | ............... | H04L 29/06 713/171 |
| 2005/0251680 A1* | 11/2005 | Brown | ............... | H04L 63/061 713/171 |
| 2007/0204149 A1* | 8/2007 | Balfanz | ............... | G06Q 20/382 713/156 |
| 2009/0254981 A1* | 10/2009 | Devadas | ............... | G06F 21/31 726/5 |
| 2009/0285399 A1* | 11/2009 | Schneider | ............... | H04L 63/061 380/278 |
| 2010/0104102 A1* | 4/2010 | Brown | ............... | H04L 63/061 380/277 |
| 2010/0262828 A1* | 10/2010 | Brown | ............... | H04L 9/0844 713/171 |
| 2010/0262829 A1* | 10/2010 | Brown | ............... | H04L 63/061 713/171 |
| 2010/0306530 A1* | 12/2010 | Johnson | ............... | G06F 21/335 713/155 |
| 2011/0126013 A1* | 5/2011 | Brown | ............... | H04L 63/061 713/168 |
| 2012/0317405 A1* | 12/2012 | Chang | ............... | G06F 1/3293 713/2 |
| 2013/0219172 A1* | 8/2013 | Johnson | ............... | H04L 63/0272 713/153 |
| 2013/0243194 A1* | 9/2013 | Hawkes | ............... | H04L 63/067 380/270 |
| 2014/0317720 A1* | 10/2014 | Johnson | ............... | H04L 63/0227 726/14 |

* cited by examiner

| | U1 | U2 |
|---|---|---|
| 1 | ↓ Stealth Enable/Logon | ↓ Stealth Enable/Logon |
| 2 | ↑ TUNNEL INIT (U2) IOCTL from callout driver | |
| 3 | Create U1.ENC and U1.VAL<br>For each COI<br>  Encrypt U1.ENC and U1.VAL with COI#<br>  Add to AuthToken<br>Sign AuthToken with U1.VAL<br>Send SESS0 PDU<br>State = PEND_OPEN<br>Start Retry timer | |
| 4 | ⎯⎯⎯⎯⎯⎯⎯⎯ SESS0 ⎯⎯⎯⎯⎯⎯⎯⎯→ | |
| 5 | | For each COI<br>  For each Token entry<br>    If decrypt Token entry with COI#<br>    Import U1.ENC and U1.VAL<br>    If validate AuthToken with U1.VAL<br>      Create U2.ENC and U2.VAL<br>      Create U2.ECDH key pair<br>      Build SESS1 PDU<br>      State = PEND_FINAL<br>      Start Retry timer |
| 6 | ←⎯⎯⎯⎯⎯⎯⎯⎯ SESS1 ⎯⎯⎯⎯⎯⎯⎯⎯ | |
| 7 | If decrypt with U1.ENC<br>  For every COI in AuthToken<br>    If decrypt with COI#<br>      Import U2.ENC and U2.VAL<br>      If validate AuthToken with U2.VAL<br>        If validate Sess1 with U2.VAL<br>          Import U2.ECDH<br>          Create U1.ECDH key pair<br>          Generate shared secret, open IPSec<br>          Build SESS2 PDU<br>          State = OPEN<br>          Start Keep alive timer | |
| 8 | ⎯⎯⎯⎯⎯⎯⎯⎯ SESS2 ⎯⎯⎯⎯⎯⎯⎯⎯→ | |
| 9 | | If decrypt with U2.ENC<br>  If validate Sess.2 with U2.VAL<br>    Import U1.ECDH<br>    Generate shared secret and open IPSec<br>    State = OPEN<br>    Start Keep alive timer |
| 10 | ↓ TUNNEL OPEN (U2) to callout driver | ↓ TUNNEL OPEN (U1) to callout driver |

*FIG. 8*

| | U1 | U2 |
|---|---|---|
| 1 | ↓ Stealth Enable/Logon | ↓ Stealth Enable/Logon |
| 2 | ↑ TUNNEL INIT (U2) IOCTL from callout | |
| 3 | Create U1.ENC and U1.VAL<br>For each COI<br>  Encrypt U1.ENC and U1.VAL with COI#<br>  Add to AuthToken<br>Sign AuthToken with U1.VAL<br>Send SESS0 PDU<br>State = PEND_OPEN<br>Start Retry timer | |
| 4 | ——————— SESS0 ———————▶ | |
| 5 | | If COI decryption or validation fails<br>  Drop incoming PDU |
| 6 | Time out<br>  Rebuild SESS0 PDU | |
| 7 | ——————— SESS0 ———————▶ | |
| 8 | Time out<br>  If Retry Limit Reached | |
| 9 | | If COI decryption or validation fails<br>  Drop incoming PDU |
| 10 | ↓ TUNNEL CLOSED (U2) to callout driver | |

|   | U1 | U2 |
|---|---|---|
| 1 | ↓ Stealth Enable/Logon | ↓ Stealth Enable/Logon |
| 2 | ↑ TUNNEL INIT (U2) IOCTL from callout driver | ↑ TUNNEL INIT (U1) IOCTL from callout driver |
| 3 | Build and send SESS0 | Build and send SESS0 |
|   | SESS0 → | |
| 4 | ← SESS0 | |
| 5 | If SESS0 validation Succeeds<br>  Build and send SESS1 | If SESS0 validation Succeeds<br>  Build and send SESS1 |
|   | SESS1 → | |
| 6 | ← SESS1 | |
| 7 | If SESS1 validation Succeeds<br>  If U2.SessionId < U1.SessionId<br>    Build and Send SESS2 | If SESS1 validation Succeeds<br>  If U2.SessionId < U1.SessionId<br>    Build and Send SESS2 |
| 8 | SESS2 → | |
| 9 | ↓ TUNNEL OPEN (U2) IOCTL to callout driver | ↓ TUNNEL OPEN (U1) IOCTL to callout driver |
|   |   | Else<br>  Ignore incoming PDU |

| | U1 | Appl1 |
|---|---|---|
| 1 | ↓ Stealth Enable/Logon<br>ENABLE_STEALTH IOCTL to MLSTPGW Driver | |
| 2 | Init License tunnel     INI2 PDU (Request) ⟶ | |
| 3 | License tunnel Open ⟵    Ini2 PDU (Response) | |
| 4 | ↑ LICENSE OPEN IOCTL from MLSTPGW driver<br>IpSec tunnels can now open<br>. | |
| 5 | Successfu IpSec Session Exchange with U2 | |
| 6 | ↓ TUNNEL OPEN (U2) IOCTL to callout driver | |
| 7 | Start logging process<br>↓ MT_LOG_EVENT to MLSTPGW driver | |
| 8 | MLSTPGW driver builds and sends<br>Tunnel Open LOG PDU     LOG PDU ⟶ | |
| 9 | | ↑ STEALTHII LOG to MLSTP Service |
| 10 | | MLSTP_Service writes "IPSec Tunnel Open" Event to System Log |

| | U1 | AuthServer |
|---|---|---|
| 1 | Create USSL (RSA 3072) Key Pair<br>Enable Stealth/Log on | Provisioning XML |
| 2 | ObtainAuthServerURL and certificate | |
| 3 | Export USSL public key to key blob<br>Wrap the USSL public key blob with the<br>AuthServer certificate and store it in the<br>usslkey element of the XML. | |
| 4 | →  HTTP Request (XML) → | |
| 5 | | Unwrap usslkey withAuthServerprivate key<br>For each COI Key<br>  Rewrap COI key with public usslkey<br>  Store wrapped COI key in XML |
| 6 | ← HTTP Reply (XML) ← | |
| 7 | For each COI key<br>Unwrap COI key with USSL private key<br>Import COI key into CNG key store<br>Rewrap COI key with SecureParser public key<br>Send wrapped COI key to driver | |

COMMUNITY OF INTEREST-BASED SECURED COMMUNICATIONS OVER IPSEC

CROSS-REFERENCE TO RELATED APPLICATIONS

The present application claims priority from U.S. Provisional Patent Application No. 61/814,431, filed Apr. 22, 2013 the disclosure of which is hereby incorporated by reference in its entirety.

TECHNICAL FIELD

The present application relates generally to community of interest-based secured communications over IPsec.

BACKGROUND

Modern organizations generate store, and communicate large quantities of data. In many instances, organizations include individuals having different rights to data, or different rights to communicate with other individuals or access particular computing resources. It is frequently important that such organizations be able to quickly and securely access the data stored at the data storage system. In addition, it is frequently important that data stored at a data storage system, or communicated between computing systems, be recoverable if the data is communicated or written incorrectly or are otherwise intercepted or corrupted.

To address the above issues, Unisys Corporation of Blue Bell, Pennsylvania developed a Stealth solution that uses a kernel-level driver to implement end-to-end cryptographic connections for communication of data across public and private networks. This solution allows users to communicate with other users having common user rights, while segregating user groups by way of assignment of different cryptographic keys used for each user group, or "community of interest". However, the Stealth solution has some drawbacks. First, the existing Stealth solution is only compatible with IPv4 networks; with the increasing proliferation of IPv6 addressing, some migration is needed. Secondly, the existing Stealth solution resides primarily in drivers at the kernel level, and as such is specifically tailored for use on specific operating systems (e.g., Windows-based systems); an incompatible computing system is typically placed behind a Stealth-enabled appliance that can be used to route communications on the behalf of that incompatible computing system. Furthermore, since the existing Stealth solution utilizes a proprietary cryptographic library, it is less trusted by large corporations and governments, who prefer standards-based security systems.

Internet Protocol Security (IPsec) is one such standards-based protocol suite used for securing Internet Protocol (IP) communications by authenticating and encrypting each IP packet of a communication session, IPsec includes protocols for establishing authentication between agents at the beginning of the session and negotiation of cryptographic keys to be used during the session. IPsec is an end-to-end security scheme of the Internet Protocol Suite. As compared to other security systems, such as SSL, SSH, or TLS, IPsec operates in the Internet Layer rather than operating in the upper layers of the TCP/IP model. Hence, IPsec protects any application traffic across an Internet Protocol (IP) network. Applications do not need to be specifically designed to use IPsec, whereas TLS/SSL is required to be designed into an application to protect the application protocols. In addition, IPsec operates in both IPv4 and IPv6-enabled networks.

However, IPsec is not without drawbacks. Existing IPsec-enabled systems typically negotiate to create IPsec tunnels, or secure tunnels, on a point-to-point basis, rather than allowing for data access by multiple entities within the same "community of interest". Furthermore, IPsec is only available on modern computing systems. In Windows environments, IPsec is only available as part the native operating system since the release of Windows 7; prior versions lack support for this security protocol suite. Furthermore, different implementations of IPsec on different types of computing systems are handled differently, leading to inconsistencies in connection parameters. Additionally, IPsec is built based on a premise that two computing systems can negotiate security parameters; when two such systems intend to form a secure tunnel, that tunnel is established through use of an IKE key exchange, which requires a response to an initial transmission. However, to accomplish perfect forward secrecy, such trading of security parameters may not be possible. Accordingly, improvements in the various existing secured communications systems are desired.

SUMMARY

In accordance with the following disclosure, the above and other issues are addressed by the following:

In a first aspect, a method of establishing secure communications between endpoints is disclosed. The method includes transmitting from a first endpoint to a second endpoint a first message including a token, the token including one or more entries, each entry corresponding to a community of interest associated with a user of the first endpoint and including an encryption key and a validation key associated with the first endpoint and encrypted with the corresponding community of interest key. The method also includes receiving from the second endpoint a second message including a second authorization token at the first endpoint, the second authorization token including one or more entries, each entry corresponding to a community of interest associated with a second user of the second endpoint and including an encryption key and a validation key associated with the second endpoint and encrypted with the corresponding community of interest key. The method further includes, for each community of interest associated with both the first user and the second user, decrypting an associated entry in the second authorization token to obtain the encryption key and validation key associated with the second endpoint. The method also includes creating a key pair at the first endpoint and generating a shared secret based on the key pair, and transmitting a third message including the created key pair to the second endpoint, thereby allowing the second endpoint to derive the shared secret. The method includes initializing a tunnel between the first and second endpoints, the tunnel using the shared secret to derive encryption keys used for IPsec-secured communications between the first and second endpoints.

In a second aspect, a method of establishing secure communications between endpoints is disclosed. The method includes receiving from a first endpoint at a second endpoint a first message including a token, the token including one or more entries, each entry corresponding to a community of interest associated with a user of the first endpoint and including an encryption key and a validation key associated with the first endpoint and encrypted with the corresponding community of interest key. The method also includes, for each community of interest associated with both the first user and the second user, decrypting an associated entry in the first authorization token to obtain the encryption key and validation key associated with the first endpoint. The method also includes creating a key pair at the second endpoint, and transmitting to the first endpoint from the second endpoint a second message including a second authorization token, the second authorization token including one or more entries, each entry corresponding to a community of interest associated with a second user of the second endpoint and including an encryption key and a validation key associated with the second endpoint and encrypted with the corresponding community of interest key. The method also includes receiving at the second endpoint a third message including a key pair created at the first endpoint encrypted with the encryption key of the second endpoint, and deriving at the second endpoint the shared secret from the key pair created at the first endpoint and the key pair created at the second endpoint The method includes initializing a tunnel between the first and second endpoints, the tunnel using the shared secret to derive encryption keys used for IPsec-secured communications between the first and second endpoints.

In a third aspect, a system includes a first endpoint and a second endpoint. The first endpoint includes a computing system configured to transmit a first message to a second endpoint, the first message including a token, the token including one or more entries, each entry corresponding to a community of interest associated with a user of the first endpoint and including an encryption key and a validation key associated with the first endpoint and encrypted with the corresponding community of interest key. The computing system is also configured to receive from the second endpoint a second message including a second authorization token, the second authorization token including one or more entries, each entry corresponding to a community of interest associated with a second user of the second endpoint and including an encryption key and a validation key associated with the second endpoint and encrypted with the corresponding community of interest key. The computing system is further configured to, for each community of interest associated with both the first user and the second user, decrypt an associated entry in the second authorization token to obtain the encryption key and validation key associated with the second endpoint. The computing system is also configured to create a key pair and generating a shared secret based on the key pair, and transmit a third message including the created key pair to the second endpoint, thereby allowing the second endpoint to derive the shared secret. The computing system is configured to initialize a tunnel to the second endpoint, the tunnel using the shared secret to derive encryption keys used for IPsec-secured communications by the first endpoint. The second endpoint includes a second computing system communicatively connected to the computing system at the first endpoint. The second computing system is configured to receive the first message and, for each community of interest associated with both the first user and the second user, decrypt an associated entry in the token to obtain the encryption key and validation key associated with the first endpoint. The second computing system is also configured to create a second key pair, transmit the second message to the first endpoint, the second message including the second authorization token and the second key pair, and receive the third message. The second computing system is also configured to derive at the second endpoint the shared secret from the key pair created at the first endpoint and the key pair created at the second endpoint, and initialize a tunnel to the first endpoint using the shared secret to derive encryption keys used for IPsec-secured communications by the second endpoint.

This summary is provided to introduce a selection of concepts in a simplified form that are farther described below in the Detailed. Description. This summary is not intended to identify key features or essential features of the claimed subject matter, nor is it intended to be used to limit the scope of the claimed subject matter.

BRIEF DESCRIPTION OF THE DRAWINGS

FIG. 8 is a message flow diagram illustrating a successful session initialization process, according to an example embodiment of the present disclosure;

FIG. 9 is a message flow diagram illustrating a failed session initialization process based on a lack of correct encryption/decryption keys, according to an example embodiment of the present disclosure;

FIG. 12 is a message flow diagram illustrating a session collision, according to an example embodiment;

FIG. 15 is a message flow diagram illustrating a license and logging events in association with an open connection, according to an example embodiment;

FIG. 16 is a message flow diagram illustrating a key exchange with an authorization server, according to an example embodiment;

DETAILED DESCRIPTION

Figure 1:
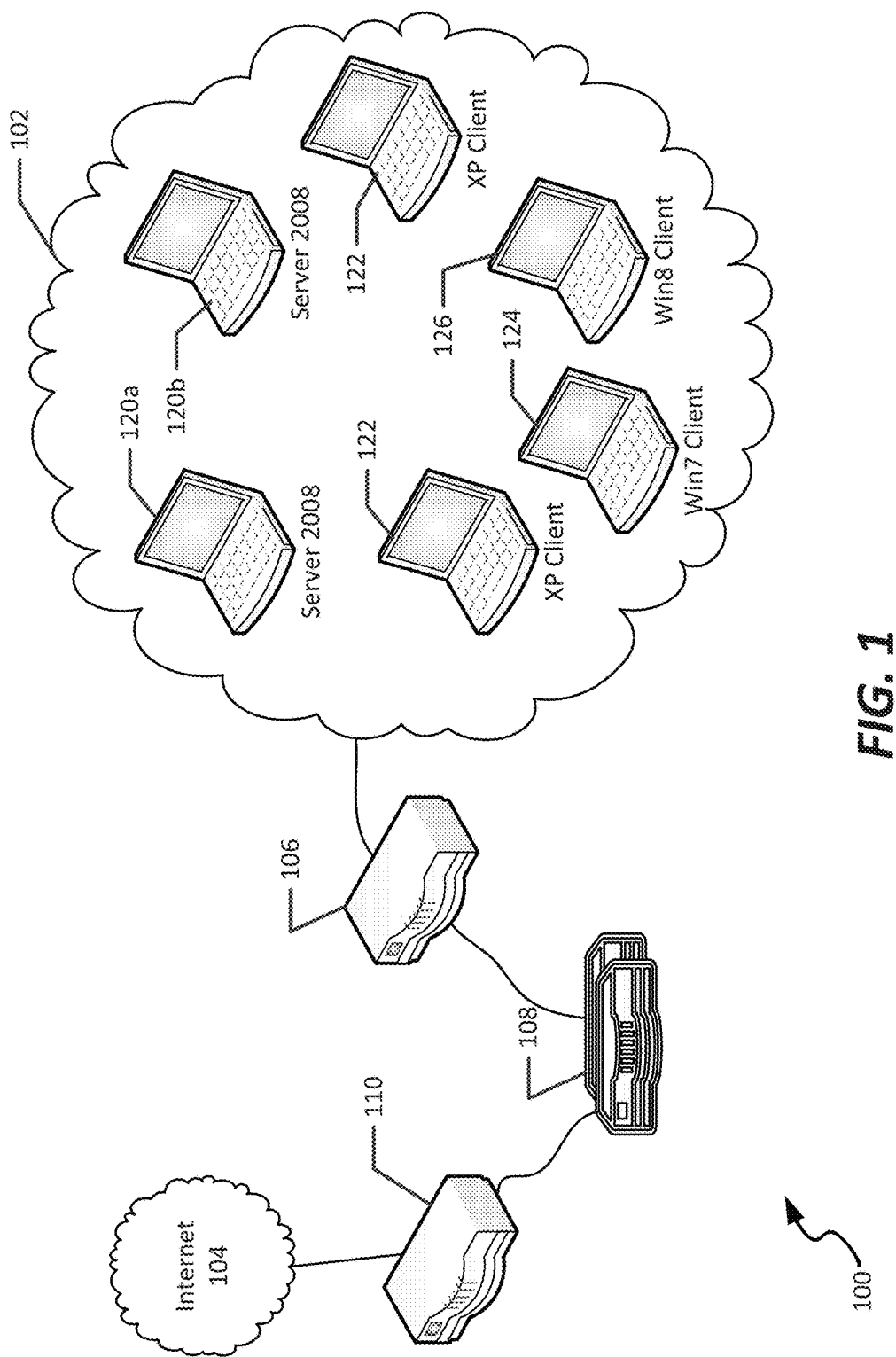
FIG. 1 illustrates an example network in which secured communications and secured endpoints can he implemented, according to the methods and systems described herein.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to improvements to systems and methods for securing endpoints and communication channels, such as the Stealth secure communications and storage system of Unisys Corporation of Blue Bell, Pennsylvania. As is included in the existing Stealth system, data to be transmitted among endpoints (e.g., client or server computing systems) is encrypted such that (1) no computing system other than the sender and intended recipient can view the contents of the encrypted message(s), and (2) in some embodiments, the messages are configurable such that message packets themselves are split among different packets and optionally transmitted along different transmission paths between computing systems, to ensure receipt of the secured communications at a receiving endpoint. That receiving endpoint can then reconstruct the message based on one or more such received split and encrypted messages.

The present disclosure specifically describes aspects of a secure communications and secure computing systems that provides (1) simplified, application level security controls, (2) support for various addressing schemes, such as Internet Protocol Version 4 (IPv4) and Internet Protocol Version 6 (IPv6), and (3) selectability among a plurality of security constructs, including existing proprietary constructs and standardized constructions that allow for such application level security controls. Additionally, improvements to the mechanisms used to manage connectivity between computing systems that implement the Stealth system provide for both secure communications between two endpoints even within a common community of interest with other endpoints, and ensures that the connectivity is accomplished using perfect forward secrecy, ensuring that any unauthorized access of an endpoint within a Stealth-enabled network is not responded to, even with a response indicating failure. As such, from the perspective of a requesting computing system an unauthorized endpoint appears "dark" or non-responsive. Additional features, such as a callout driver configured to manage creation and negotiation of an IPsec-based tunnel using specific defined processes, are provided as well.

It is noted that a complete description of the existing Stealth solution may be found in several pending and commonly assigned U.S. Patent Applications:

U.S. patent application, Ser. No. 12/272,012, entitled "BLOCK LEVEL DATA STORAGE SECURITY SYSTEM", filed 17 Nov. 2008.

U.S. patent application, Ser. No. 12/336,558, entitled "DATA RECOVERY USING ERROR STRIP IDENTIFIERS", filed 17 Dec. 2008.

U.S. Provisional Application Ser. No. 60/648,531, filed Jan. 31, 2005, entitled "INTEGRATED MULTI-LEVEL SECURITY SYSTEM", as a continuation-in-part.

U.S. patent application Ser. No. 11/339,974, filed Jan. 26, 2006, entitled "INTEGRATED MULTI-LEVEL SECURITY SYSTEM," which itself is a continuation-in-part of Ser. No. 60/648,531 above, as a continuation-in-part.

U.S. patent application Ser. No. 11/339,974, filed Jan. 26, 2006, entitled "SECURING AND PARTITIONING DATA IN MOTION USING A COMMUNITY OF INTEREST", which itself is a continuation-in-part of Ser. No. 11/339,374, as a continuation-in-part.

U.S. patent application, Ser. No. 12/336,559 entitled "STORAGE SECURITY USING CRYPTOGRAPHIC SPLITTING", filed 17 Dec. 2008.

U.S. patent application, Ser. No. 12/336,562, entitled "STORAGE SECURITY USING CRYPTOGRAPHIC SPLITTING", filed 17 Dec. 2008.

U.S. patent application, Ser. No. 12/336,564, entitled "STORAGE SECURITY USING CRYPTOGRAPHIC SPLITTING", filed 17 Dec. 2008.

U.S. patent application, Ser. No. 12/336,568, entitled "STORAGE SECURITY USING CRYPTOGRAPHIC SPLITTING", filed 17 Dec. 2008.

U.S. patent application, Ser. No. 12/342,438 entitled "STORAGE AVAILABILITY USING CRYPTOGRAPHIC SPLITTING", filed 23 Dec. 2008.

U.S. patent application, Ser. No. 12/342,464, entitled. "STORAGE AVAILABILITY USING CRYPTOGRAPHIC SPLITTING", filed 23 Dec. 2008.

U.S. patent application, Ser. No. 12/342,547, entitled "STORAGE OF CRYPTOGRAPHICALLY-SPLIT DATA BLOCKS AT GEOGRAPHICALLY-SEPARATED LOCATIONS", filed 23 Dec. 2008.

U.S. patent application, Ser. No. /342,523, entitled "RETRIEVAL OF CRYPTOGRAPHICALLY -SPLIT DATA BLOCKS FROM FASTEST-RESPONDING STORAGE DEVICES", filed 23 Dec. 2008.

U.S. patent application, Ser. No. 12/312,500, entitled "BLOCK-LEVEL DATA STORAGE USING AN OUTSTANDING WRITE LIST", filed 23 Dec. 2008.

U.S. patent application, Ser. No. 12/342,636, entitled "STORAGE COMMUNITIES OF INTEREST USING CRYPTOGRAPHIC SPLITTING", filed 23 Dec. 2008.

U.S. patent application, Ser. No. /342,575, entitled "STORAGE COMMUNITIES OF INTEREST USING CRYPTOGRAPHIC SPLITTING", filed 23 Dec. 2008.

U.S. patent application, Ser. No. 12/342,610, entitled "STORAGE COMMUNITIES OF INTEREST USING CRYPTOGRAPHIC SPLITTING", filed 23 Dec. 2008.

U.S. patent application, Ser. No. 12/342,414, entitled "VIRTUAL TAPE BACKUP ARRANGEMENT USING CRYPTOGRAPHICALLY SPLIT STORAGE", filed 23 Dec. 2008.

U.S. patent application, Ser. No. 13/105,173, entitled "Methods and Systems for Implementing a Secure Boot Device Using Cryptographically Secure Communications Across Unsecured Networks", filed 11 May 2011.

All of these applications are hereby incorporated by reference as if they were set out here in their entirety.

I. Overall Infrastructure of IPsec-Based Stealth Solution

FIG. 1 illustrates an example network 100 in which the various improved secured communications and secured endpoints can be implemented, according to the methods and systems described herein. The example network 100 discloses an arrangement in which a particular entity 102 is communicatively connected to the Internet 104 via a variety of networking equipment, such as a router 106, gateway device(s) 108, and additional routers 110 at a far end prior to reaching a remote resource or server as desired. As noted in the example network 100, the entity 102 may include a variety of different types of computing systems. For example, in the embodiment shown, the network 100 includes servers 120a-b running Microsoft Windows Server 2008, as well as client computing devices running a variety different operating systems, such as client systems 120 utilizing the Windows XP operating system from Microsoft Corporation of Redmond, Wash., a further client system 124 running the Windows 7 operating system, and a still further client system 126 running the Windows 8 operating system.

In some embodiments of the present disclosure, the methods and systems discussed herein use the Windows Filtering Platform (WFP), a new architecture provided in Windows Vista operating systems and above. The WFP allows for filtering, monitoring and/or modification of TCP/IP packets as well as filtering of IPSec traffic. The WFP allows for access to TCP/IP processing at different layers and can be used to filter on incoming or outgoing traffic. The WFP platform can therefore be used by servers 120a-b and clients 124, 126, but cannot be used by clients 122. As noted in farther detail below, the present application accommodates secure communications between both types of systems by negotiating the type of cryptographic security library to be used for a connection between particular endpoints clients, servers, or other addressable computing systems generally).

Figure 2:
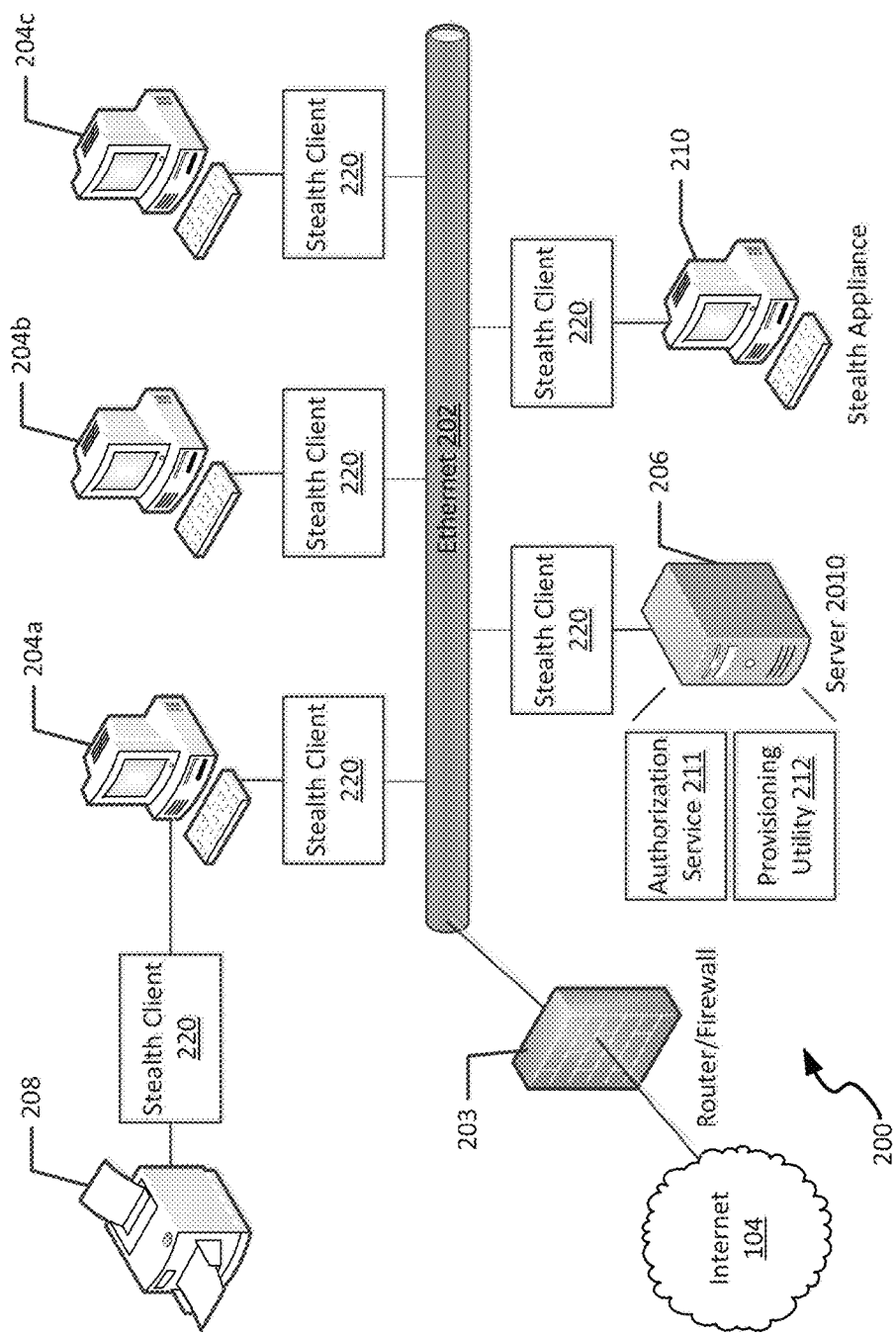
FIG. 2 illustrates an example intranet portion of the network of FIG. 1, illustrating additional details regarding secured interconnection of computing systems, according to an example embodiment.

Referring now to FIG. 2, an example intranet portion 200 of the network 100 of FIG. 1 is shown, illustrating specific details of the secured interconnection of computing systems of FIG. 1. In general, the intranet portion 200 includes a network, such as Ethernet 202, that is communicatively connected to an outside environment, such as the Internet 104, via a firewall 203. Ethernet 202 supports communicative interconnections among a plurality of different types of computers and equipment. For example, in the embodiment shown, client systems 204a-c, a server 206, printer 208 (which could be connected via a client system, such as client system 204a, or directly to the Ethernet 202) could be communicatively interconnected via the Ethernet 202.

To manage secure communications among the various computing systems disclosed, a Stealth appliance, shown as appliance 210, is included within the intranet 200. The appliance 210, as further, discussed below, manages licensing, and receives connections via the existing, kernel-based Stealth implementation. The appliance 210, in some embodiments, operates using an existing multi-level secure transport protocol (MLSTP) secure communications construct, and receives license tunnel requests from endpoints that request licenses for creating other tunnels to other endpoints. The appliance 210 also manages logging of events occurring within the secure connections, with log events received via the license tunnel from various endpoints (e.g., client systems 204a-c). An example of a licensing tunnel creation and a license request is shown in FIG. 15, below.

Each of the computing systems within the intranet 200 are enabled with a Stealth client 220. This can include integration of such a Stealth client onto the computing system itself, in particular for Windows-based computing systems or computing systems implementing IPsec (e.g., Linux, Apple, Solaris, etc.). It could alternatively include positioning a Stealth appliance, such as appliance 210, between that computing system and the Ethernet 202 that interconnects computing systems 202a-c, 204, thereby isolating that computing system from unsecured communication.

As noted above, the computing systems 204a-c, 204 may be of different types or architectures, or may also simply be using different versions of an operating system. Accordingly, IPsec may or may not be supported on each such computing system, or may be supported in a different way. Accordingly, each computing system will be enabled with a different Stealth client based on the type of computing system, either installed on that system or in the form of a standalone Stealth appliance. Furthermore, to allow different computing systems to securely communicate, different components may be required to be installed. For example, for Windows XP and Windows Server 2003 endpoints, an existing Stealth solution is installed, using a multi-level secure transport protocol (MLSTP) driver; Windows 7, Server 2008 R2, and Windows 8 systems can include this existing MLSTP driver for backwards-compatibility purposes, but also include, integrated therein, the IPsec communications stack discussed herein, in particular with respect to FIGS. 4 and 6. Accordingly, in some cases, a first and second of the computing systems 204a-b may connect via an IPsec tunnel, while each of the first and second computing systems 204a-b may not be able to connect to the third computing system 204c via IPsec; rather, an existing MLSTP driver may be required, for example due to third computing system 204c executing an older operating system version, or being a different type of computing system, or otherwise lacking native IPsec support that is compatible with computing systems 204a-b.

In connection with the present disclosure, and as further illustrated in connection with the driver implementations below, an auto-negotiation process is performed between two endpoints to determine how best to securely interconnect those endpoints. For example, where both endpoints support the IPsec-based Stealth implementation discussed herein, IPsec tunnels will be a preferred method to establish connections between systems. Therefore, for IPv6 endpoints, a transmitting endpoint will attempt to connect to that remote endpoint using an IPsec tunnel. For IPv4 endpoints, the transmitting endpoint (assuming it is IPsec-enabled) will attempt to connect via a preexisting MLSTP tunnel first, but if that attempt fails, an IPsec-based Stealth connection is initiated. If that tunnel creation attempt also fails, either of MLSTP or IPsec could be retried again, with each retried in an alternating sequence until connection to the far-end endpoint is established.

In some instances, an endpoint enabled in VPN mode can use the MSLTP Stealth connection, over which the VPN tunnel is established. In alternative embodiments, the VPN client can call a new driver, or its application-level interface, to establish a secure IPsec-based Stealth tunnel.

In the embodiment shown, a server, such as server 206, has installed thereon one or more applications assisting with operation of a Stealth-enabled network, including an authorization service 211, and a provisioning utility 212. The authorization service 211 can be installed on either a MLSTP-compatible or IPsec-compatible server system (e.g., a Windows-based system using either Windows Server 2008 or previous versions), and executes in the background on that server. The authorization service 211 also stores certificates and keys useable by an endpoint to communicate with other endpoints; an example of a key exchange process with an authorization server, for example to substitute a new key, is illustrated in FIG. 16, described below. The authorization service 211 also handles authorization requests received from endpoints, as further noted below. The provisioning utility 212 allows IP address and port ranges to be specified by a user, and also handles IPv6 addresses for community of interest filters. The authorization service 211 can also be interfaced, in some embodiments, to a configuration utility, which provides an administrative user interface which allows an administrative user to identify each endpoint and define a set of parameters to be used when communicating among endpoints. For example, endpoint parameters can include the number of shares a message should be cryptographically split into (M) and a number of those shares that should be required to recreate the message (N), as well as a queue depth allowable at an endpoint.

Figure 3:
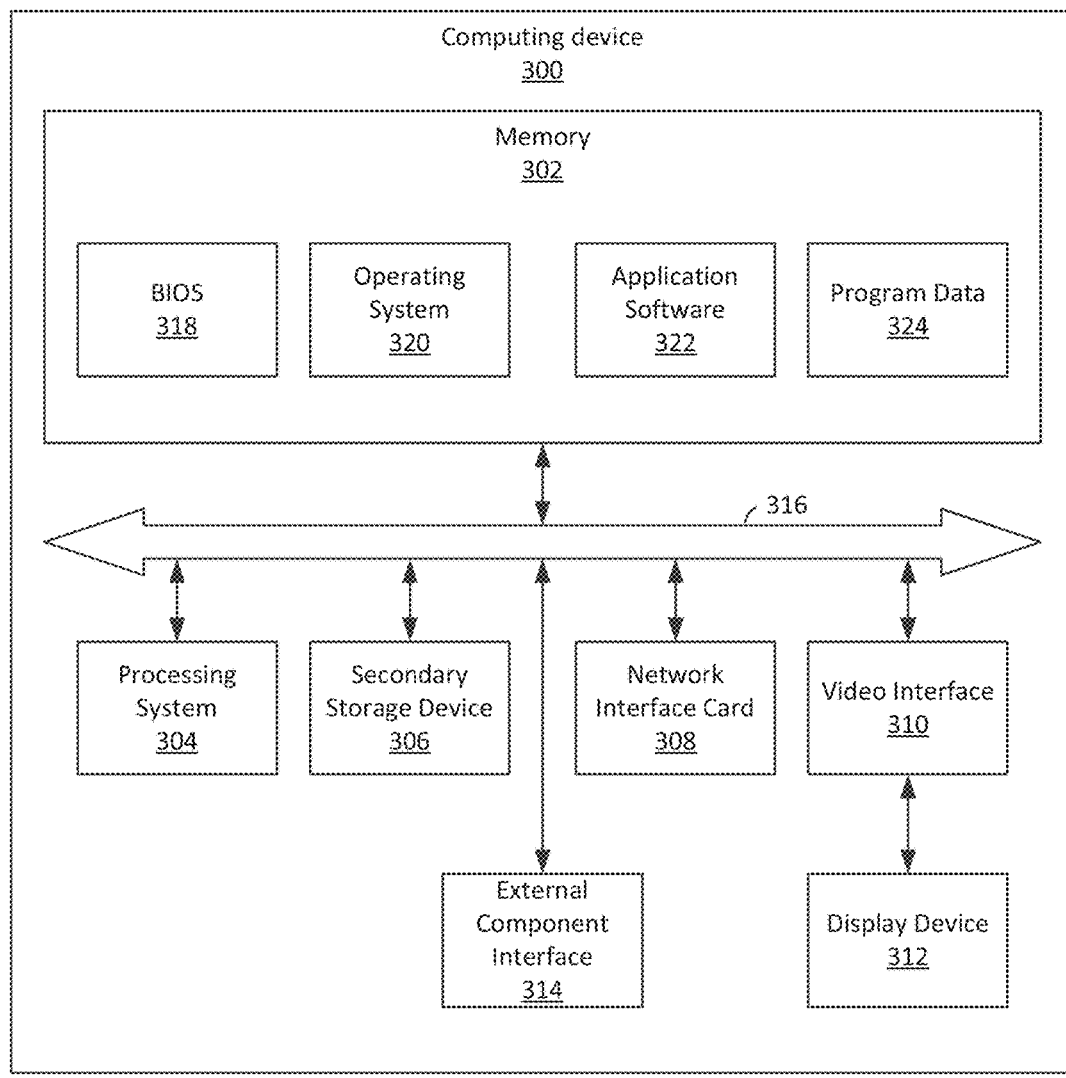
FIG. 3 is a schematic illustration of an example computing system in which aspects of the present disclosure can be implemented.

Referring now to FIG. 3, a schematic illustration of an example computing system in which aspects of the present disclosure can be implemented. The computing device 300 can represent, for example, a native computing system within which one or more of systems 120a-b, 122, 124, 126, 204a-c, 206, 210. In particular, the computing device 300 represents the physical construct of an example computing system at which an endpoint or server could be established. In particular, in various embodiments, the computing device 300 implements one particular instruction set architecture, and can be used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an A SIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within an electronic computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, although in the embodiments of FIG. 3 shown the computing device 300 represents a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package. One such system virtualization package is the Unisys Secure Partitioning (SPar) partitioning and virtualization system provided by Unisys Corporation of Blue Bell, Pennsylvania.

Figure 4:
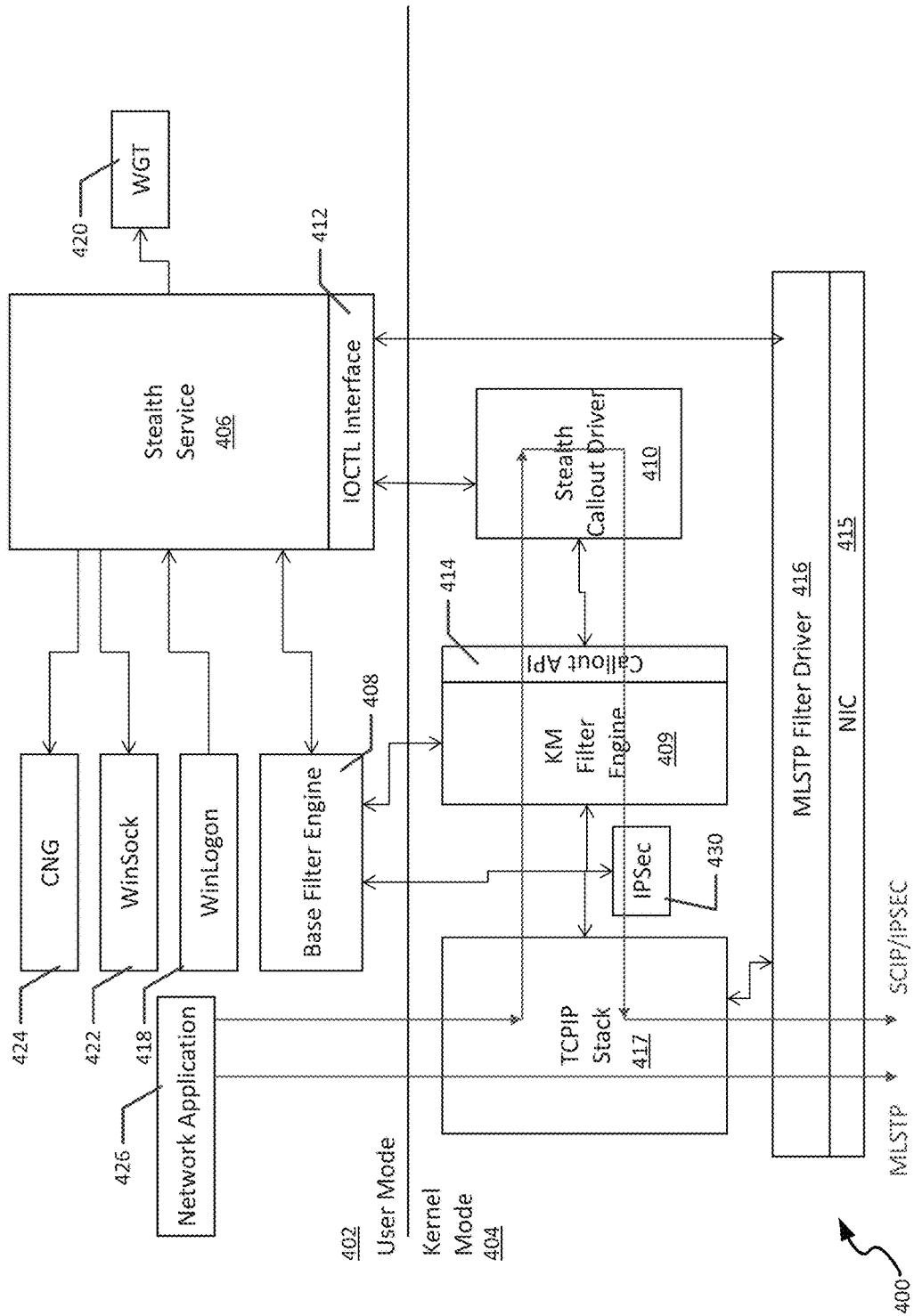
FIG. 4 is an example block diagram of relevant portions of an endpoint implementing the secured communications architecture utilizing internet protocol security (IPsec), as discussed herein.

FIG. 4 is an example block diagram of a system 400 that utilizes an IPsec implementation present on a computing system, in an example embodiment of the present disclosure. The computing system can be, for example, an endpoint, such as one of the computing systems described in FIGS. 1-2. In the embodiment shown, a user mode 402 and kernel mode 404 are shown, with a user level service 406 that creates one or more WFP filters, and directs a native base filter engine 408 to use IPSec for specific endpoint to endpoint traffic. In the embodiment shown, the filter engine 408 can also include a kernel mode filter engine component 409.

A callout driver 410, interconnected, to the user level service 404 by an IOCTL interface 412, is used to identify new endpoints that require the establishment of a Stealth tunnel. The callout driver 410 interfaces to a callout application programming interface (API) 414, which defines the kernel mode interface to the kernel mode filter engine component 409.

An MLSTPGW driver 416 passes all IPv6 traffic from a physical network interface card (NIC) 415) to the upper layer for processing. This can be, for example, based on a registry setting accessible to the MLSTPGW driver 410, indicating that another Stealth/security construct is being used by the endpoint. The MLSTPGW driver 416 is generally a filter driver that intercepts all IP traffic and is used to manage communications over MLSTP tunnels. Regarding the prioritization of IPsec vs. MLSTP as noted above in connection with FIGS. 1-2, in the embodiment shown, the MLSTPGW driver 416 at least initially allows for traffic to flow through that driver in cases where IPv6 is used, and where the system on which the driver 416 is installed is at least a Windows 7 or other IPsec-compliant device. Initially all IPv4 and IPv6 traffic passes through the MLSTPGW driver 416 and TCP/IP stack 417, to the callout driver 410, to be blocked until an IPsec or MSLTP tunnel is established between the peers. The user level service 406 will request the MLSTPGW driver 416 to attempt to establish an MLSTP tunnel for an IPv4 endpoint. This request is made using an IOCTL, and the MLSTPGW driver 416 is modified to implement this IOCTL. If an MLSTP tunnel is established, the MLSTPGW driver 416 informs the user level service 416 through another IOCTL. If the MLSTP tunnel fails for an IPv4 endpoint, instantiation of an IPsec tunnel is attempted, as noted above. It is noted that in some embodiments, if an IPsec tunnel cannot be established to a remote IPv6 endpoint, tunnel formation fails (i.e., no MLSTP tunnel may be available for IPv6).

The callout driver 410 is used to interface with the WFP, which is generally native in the Windows operating system of the system on which it is installed. The callout driver 410 sits above the MLSTPGW driver 416 and is also used to intercept all traffic based on how filters are configured in the WFP. The callout driver 410 is a Kernel level WFP callout driver. WFP callout drivers provide functionality that extend the capabilities of the Windows Filtering Platform. Callouts allow the callout driver 410 to examine network data in order to determine if/when an IPsec-based tunnel should be established. In some embodiments, the callout driver 410 is automatically started during system startup, and interfaces with the user level service 406 via a set of IOCTLs.

During service start up or initiation of a Stealth connection, the user level service 406 adds a provider and sublayer to the WFP system, and adds associated callouts with initial filters to the system (for both IPv4 and IPv6). An initial group of filters are added to allow traffic such as loopback, IPv4 subnet broadcast, IPv6 neighbor discovery, as well as PDUs used to control the IPsec tunnels. An additional filter is added to the system so that all other traffic is called out for further examination by the callout driver 410. A service, such as a protocol service described below in connection with FIG. 6, then informs the callout driver 410 to enable IPsec-based Stealth using an IOCTL. The callout driver 410 enables secure processing by registering the callouts with the filter engine (e.g., via kernel mode filter engine component 409), to intercept inbound or outbound connect attempts. In some embodiments, the callout driver 410 intercepts inbound and outbound connections and transport layer traffic sent to or received from remote peers and queues the packets to a worker thread for processing.

The callout driver 410 maintains a structure for each remote endpoint it is communicating with, along with a global linked list of such endpoint connections. In some embodiments, a global hash table is maintained within the callout driver 410 to help search for a connection. Each endpoint connection entry in the list tracks pending connections or accepted received connection requests, and a packet queue that wait for an IPSec tunnel to be established. Once the IPSec tunnel is established by the login service, the callout driver 410 completes the pending operation and/or reinjects the packets back into the data path. The user level service 406 sets up the IPSec tunnel such that once it is established, the driver callouts will no longer be invoked for data on this connection.

In general, the callout driver 410 performs a process for each packet that is received at the endpoint. Generally, the callout driver 410 will permit the packet if it was already previously inspected, or block the packet if the service is not initialized or there are no Global Service Events available (e.g., for sending IOCTLs to the user level service 406 to handle the received packet). The callout driver 410 will then search its hash table, and create an entry. If a Stealth tunnel (IPsec or MLSTP) is already open, the packet is permitted. Otherwise the packet is initialized to be reinserted at a later time, and added to a connection list or packet queue, and the callout driver 410 then informs the user level service 406 to initialize a tunnel to the remote endpoint identified by the remote IP address.

In operation, to initialize a Stealth tunnel (e.g., via IPsec) the user level service 406 registers call out filters with the base filter engine 408, including various ALE layer and transport layer filters. The system then allows UDP Stealth-based port traffic, and notifies a user to provide logon credentials (e.g., from a windows login manager 418). The user level service 406 accesses a WGT file 420, which contains community of interest keys associated with the logged-in user, to determine if the user has rights to connect to a particular other endpoint (e.g., an endpoint that is attempting to connect to the current endpoint, or to which traffic is directed). At that point, driver filters are activated, for example via the base filter engine 408 and kernel mode filter engine 409.

An IOCTL message is passed to the user mode service 406 that includes the IP address of the local and remote endpoints. The user mode service 406 will then respond, and process the WGT file 420 to generate session keys for the tunnel to the remote endpoint. A UDP socket is opened to the remote endpoint, and session PDUs are exchanged, containing keys to be used for communication. If the exchange of session keys is successful, the user level service 406 validates the exchange of keys used to generate a shared secret on corresponding endpoints. The shared secret, as discussed further below, is used to set the IPsec policy for the tunnel to be established. Because the shared secret is unique to each tunnel created, it allows for separate security for each IPsec tunnel being established. Pending successful negotiation of an analogous process at the remote endpoint, the callout driver then reinjects blocked data into the data path; because of the IPsec policy in place, that data is then transmitted over an IPsec tunnel to a remote endpoint.

Generally, a Winsock interface 422 is used to establish UDP sockets between endpoints for exchanging protocol messages, such as the protocol datagram units (PDUs) discussed below, and a Cryptographic Next Generation (CNG) interface 424 provides a Windows-based user-mode encryption API to which the various Stealth-based systems of the present disclosure can be interfaced. Accordingly, a network application, shown as network application 426, can communicate with an endpoint while being secured using IPsec or MLSTP tunnels established by the user level service 406, callout driver 410, and IPsec module 430 or MLSTP driver 416.

In general, and through use of the above-described connection sequences, it can be ensured that the endpoint implementing IPsec-based Stealth security will not respond to a remote endpoint without first determining that it is allowed to do so, based on review of communities of interest contained in WGT file 420, and based on filter rules defined using the base filter engine 408 and kernel mode filter engine 409. Furthermore, because session keys are used to generate a shared secret between two endpoints in addition to use of communities of interest, even endpoints associated with users in the same community of interest will not be able to recognize communications between endpoints that have established a Stealth-based IPsec tunnel as noted herein. Additional details and illustration of these connection sequences are discussed in further detail below in connection with FIGS. 7-17.

Figure 5:
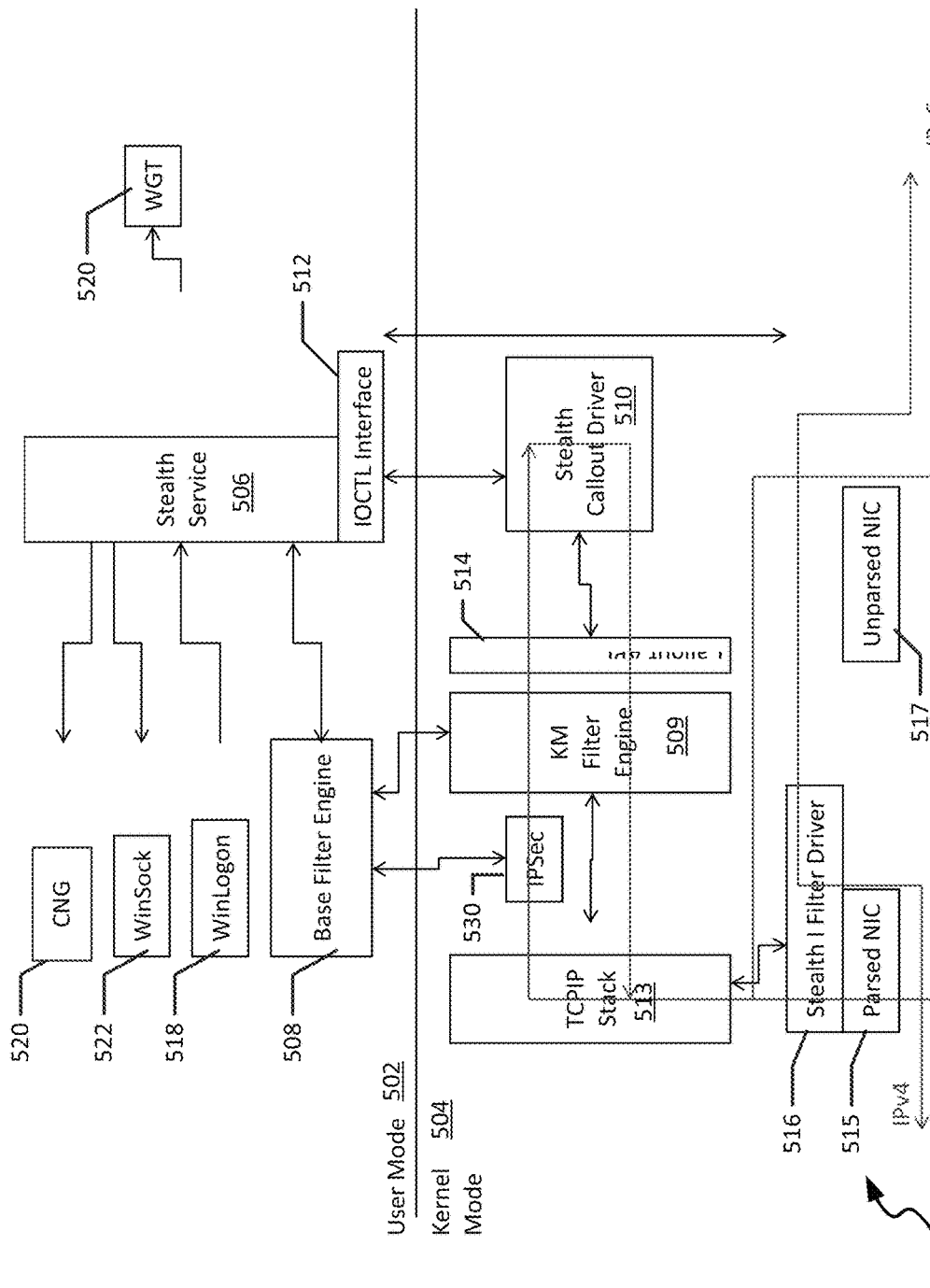
FIG. 5 is an example block diagram of relevant portions of a gateway appliance implementing a secured communications architecture including both legacy and interact protocol security (IPsec)-based security, as discussed herein.

Referring now to FIG. 5, an example block diagram of a system 500 for secure communications at a gateway implementing the internet protocol security (IPsec) implementation discussed herein is shown. Such a gateway could be used, for example, to provide IPv6-based addressing and IPsec-based security features for an otherwise unsupported endpoint, or to act as a gateway between secured and otherwise unsecured portions of a network.

Generally, the system 500 includes analogous elements to those in an endpoint (labeled with incremented reference numerals, as presented in a gateway rather than an endpoint), for establishing direct communications from the gateway. However, additional directional lines show passage of data traffic through the gateway between a protected (Stealth) network and a clear text (e.g., Internet-side) network. In the example shown, data transmitted between endpoints having IPv4 addresses pass through a MLSTP driver 516 of the gateway, and from a parsed network interface 515 to an unparsed network interface 517. IPsec-secured data is received at the parsed network interface 515 and passed through the MLSTP driver 516 as discussed above with respect to MLSTP driver 416; in this case, the IPsec-secured data is received at a TCP/IP stack 513, and routed through an IPsec encryption/decryption component 530 installed at the gateway (as opposed to the native functionality typically found in an endpoint as discussed above). The now-decrypted data passes through the filter engine 509 and exposed to the callout driver 510 via the API 514. The callout driver can then route the data, if appropriate, back through the TCP/IP stack 513 and to unparsed network interface 517 for communication as clear text. The filter engine 509, in combination with the callout driver 510 and user level service 506, prevents any data from being passed through the unparsed network interface 517 without first being ensured that it is intended to leave the "secured" side of the gateway.

Figure 6:
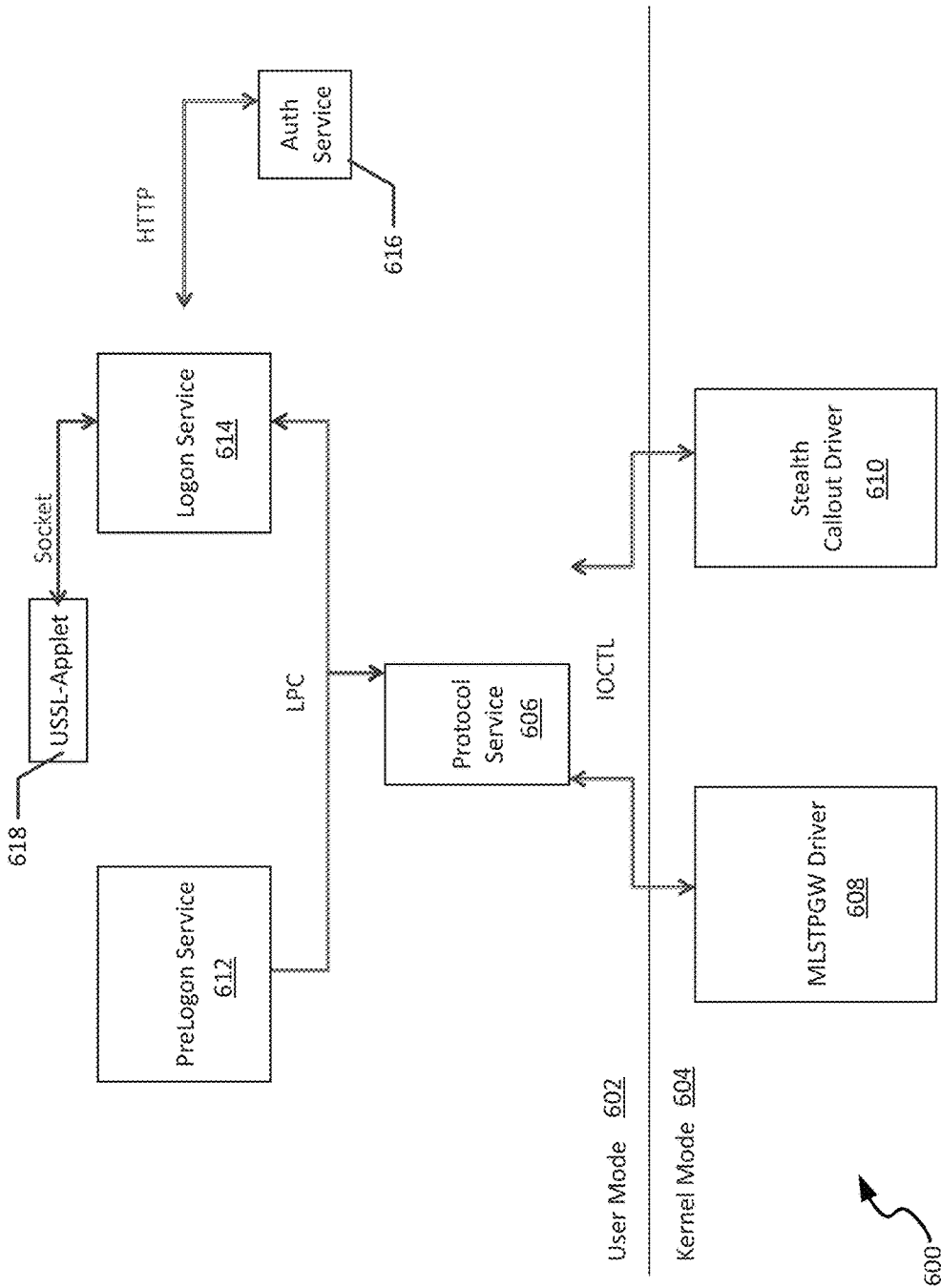
FIG. 6 is an example block diagram of a user level services system in operation on a computing device and implementing a secured communications architecture utilizing internet protocol security (IPsec), as discussed herein.

FIG. 6 is an example block diagram of a user level services system 600 in operation on a computing device and implementing the internet protocol security (IPsec) implementation discussed herein. In the example shown, the user level services system 600 depicts services operating in a user mode 602 that expose settings of drivers operating in a kernel mode 604. In particular, the settings allow a user to configure the endpoint to accomplish the secure communications configurations discussed above. For example, a protocol service 606 is interconnected to one or both of a MLSTPGW driver 608 or a callout driver 610. The protocol service 606 handles the tunnel initialization, termination, WFP interface and driver communications. Generally, the protocol service 606 provides the server side of an LPC interface while the prelogon service 612 and logon service 614 implement the client side of the LPC interface.

In particular, the protocol service 606 creates the public/private key pair and returns a public key BLOB to a prelogon service 612. The prelogon service 612 wraps each service key in a service enclave and returns the wrapped keys with the other service enclave information (i.e. clear text keys, IP addresses etc.) to the protocol service 606. The protocol service 606 then unwraps each service key using a private key, and imports each service key into the Windows key store for use in establishing IPsec tunnels. In addition, protocol service 606 wraps each service key with a public key and forwards these keys with the other service enclave information to the MLSTPGW driver 608 for use in establishing MLSTP tunnels.

The prelogon service 612 handles management of service enclaves used prior to user logon. In particular, the prelogon service 612 retrieves service keys from service enclave registry(s) and stores the enclave information. It then calls through the LPC (Windows RPC) interface to acquire a public key from the protocol service 606. Once the service enclave information has been successfully passed to the protocol service 606, the prelogon service 612 calls back into the protocol service 606 to release the public key.

The logon service 614 handles the management of logon processing, user authorization (local or via an authorization server) and user communication via a USSL-Applet interface 618. The logon service 614 is responsible for handling user logon processing, for interfacing with a local authorization service 616, for user authorization. The logon service 614 also is responsible for interfacing with the USSL-Applet 618 to provide tunnel status and handling enabling/disabling of Stealth connections (IPsec and MLSTP) and Stealth-based VPN connections. The logon service 614 can be configured to run in either client mode or server mode. In client mode it interfaces with a Win_Logon service to process user session notifications. In server mode, it uses the service credentials for user authorization. The logon service 614 supports the use of local WGTs (e.g., WGT 420 of FIG. 4, in the case of an endpoint) or authorization through an authorization service interface such as authorization service 616.

For authorization via an authorization service 616 the logon service 614 calls into the protocol service 606 to acquire the public key (from an RSA 1024 key pair). This public key is then wrapped with a certificate from the authorization server, which was stored at the endpoint during endpoint installation. The public key is then passed to the authorization service 614 in the HTTP request. The authorization service 616 unwraps the public key using its private key and then uses it to wrap the user's COI keys and return them to the logon service 614. The logon service 614 passes the wrapped COI keys to the protocol service 606, which unwraps each COI key using its private key and stores each in the Windows key store for use in establishing the IPSec tunnels. One example of using an authorization service in the manner generally described above to authorize a particular endpoint to establish a secure IPsec tunnel is illustrated in FIG. 16, described in further detail below.

The USSL-Applet interface 618 is used on endpoints (e.g., client systems 204a-c) to display tunnel status for both IPv4 and IPv6 tunnels. IPSec tunnel initiation is managed by the protocol service 606 on the corresponding endpoint. Once COI negotiation has completed via a session PDU exchange (discussed below in connection with FIG. 7), the Windows filtering platform is used to remove the user level service (e.g., user level service 406 of FIG. 4) and callout driver e,g., callout driver 410) from the IPSec tunnel path. Because of this, the data traffic passed over the IPSec tunnel cannot be tracked by the user level service 406 or callout driver 410. Instead, IPSec statistics are gathered for all IPSec traffic via the Windows Filtering Platform and displayed by the USSL-Applet 618.

Referring to FIG. 6 generally, it is noted that the timing of when a particular endpoint is Stealth-enabled may vary depending upon the mode of that endpoint; for example, in some cases the endpoint may be set to an "always on" mode in which, at startup, the protocol service 606 adds initial global filters to the WFP to be used to callout traffic. In an on-demand mode, the global filters are not added during service startup, but rather the protocol service 606 does not enable global filters until after the logon service 614 enables Stealth or a Stealth-based VPN.

II. Example Connection States and Sequences for IPsec-Based Stealth Communication Referring now to FIGS. 7-17, various connection sequences and connectivity states are shown that enable communications between endpoints (e,g., client systems 204a-c, or between such systems and a licensing appliance (e.g., appliance 210) or an authorization server (e.g., server 206). The connection sequences described herein, as discussed below, ensure that each communication tunnel between endpoints is private to those endpoints, even within a particular community of interest. The connection sequences also ensure that, for endpoints that are not part of a particular community of interest, those endpoints appear "dark", meaning that they can be addressed, but will provide no response to requests for service (including responses denying such requests).

Figure 7:
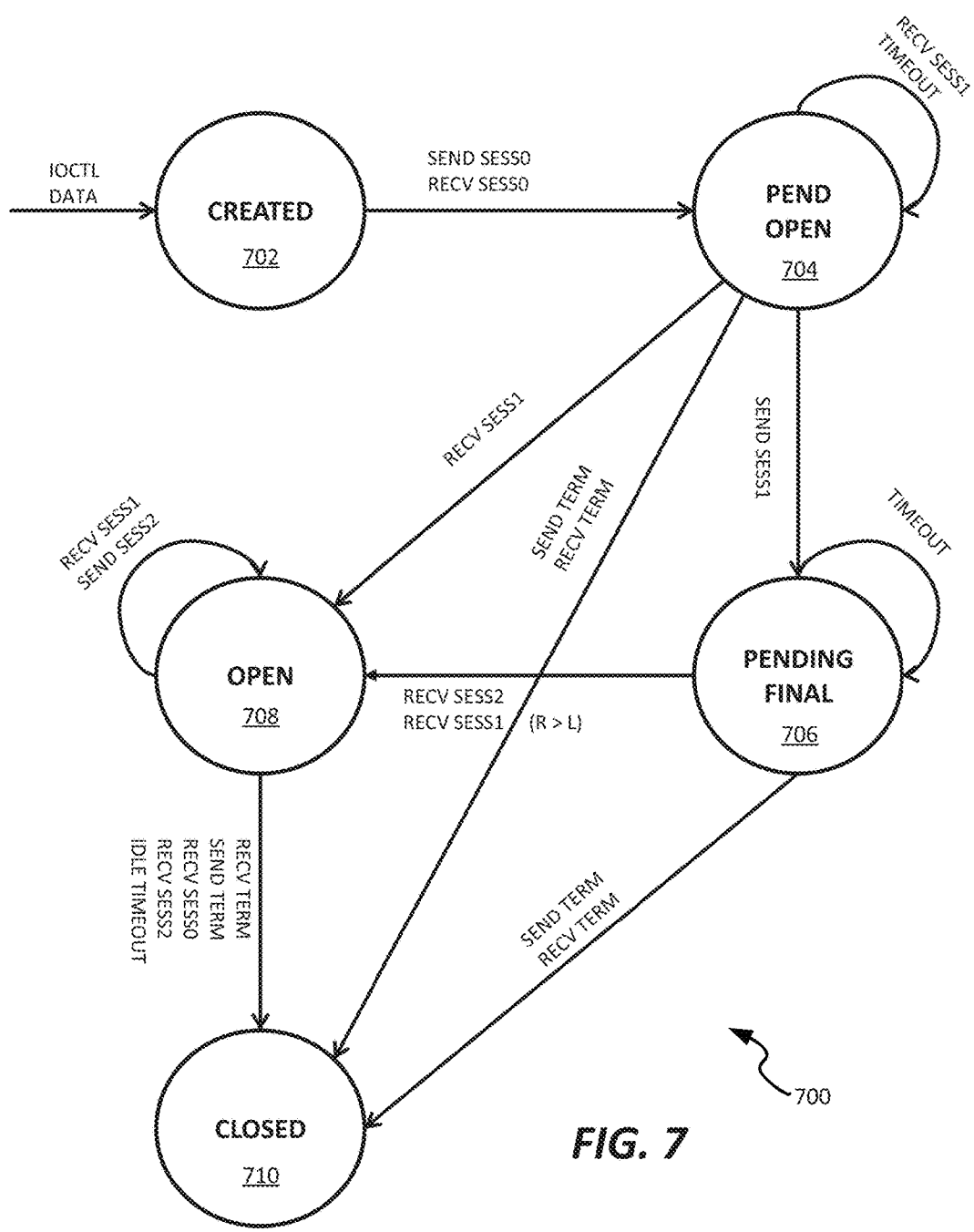
FIG. 7 is a state diagram illustrating states and state transitions utilized to initialize, maintain, and terminate a secure connection between devices secured using the methods and systems discussed herein.

FIG. 7 is a state diagram 700 illustrating states and state transitions utilized to initialize, maintain, and terminate a secure connection (tunnel) between devices secured using the methods and systems discussed herein. Generally, there are five states possible for a particular endpoint relative to a tunnel being created. These include a created state 702, a pending open state 704, an open state 706, a pending final state 708, and a closed state 710. The endpoint will progress through the states 702-710 generally by passing various session PDUs for tunnel initialization, keep-alive, and termination.

In general, there are a plurality of different session protocol data units (PDUs) used to traverse states 702-710, and are referred to as Session 0-4 PDUs. Session 0, Session 1, and Session 2 PDU are exchanged during tunnel initialization, while Session 3 PDUs are used as keep-alives, and Session 4 PDUs are used for termination of tunnels. Each of the PDUs generally includes a SCIP header (except for Session 0), which includes, generally, a number of flags defining connection settings, as well as a SessionInfo header, which defines a remote username, start time, session identifier, and various other options for creation of the secure tunnel. Discussion of each of the PDUs follows.

Session 0 PDUs are sent from an endpoint to begin initiation of an IPsec-enabled Stealth tunnel. These PDUs contain a list of the local session keys individually wrapped with each of the COI keys currently available in the WGTs.

The encryption (ENC) key and public validation (VAL) key are both encrypted with the COI key before being passed in the authorization token (seen as AuthToken in FIGS. 8-17, below). In addition, the private VAL key is used to sign the AuthToken for validation on the remote endpoint. The remote endpoint must successfully decrypt the session keys before it can use the public VAL key for validation of the Sess0 PDU.

Session 0 PDUs are sent and received on the Stealth UDP port, so that they pass through the callout driver 410 undetected. In example embodiments each token entry in the Session 0 PDU is 128 bytes long so that no padding is required during encryption. In addition, the count of communities of interest is included to verify the length of an authorization token on the remote endpoint.

Session 1 PDUs are sent from a receiving endpoint in response to a Session 0 PDU that was successfully verified and decrypted using a COI key from the WGTs (e.g., WGT 420, 520). The Session 1 PDU response contains an authorization token with the local session keys of the responding endpoint wrapped with the COI key that matched the COI key in the Sess0 PDU received, as retrieved from the WGT of the receiving endpoint. In addition, in some embodiments the Session 1 PDU contains a signature generated using a SHA 384 HMAC across all of the fields of the Session 1 PDU excluding the signature field and generated using the local VAL private key. This allows for creation of a public/private key pair that can be used in a Diffie-Hellman key agreement arrangement. The public key can be returned to the requesting endpoint in the Session 1 PDU. Once the originating endpoint (U1) receives the public key of the second endpoint (U2), it uses that key along with its own ECDH P384 private key to generate the shared secret. In some embodiments, the Session 1 PDU also contains a SCIP header and SessionInfo header. Session 1 PDUs can also be sent and received on the Stealth UDP port so that they pass through the callout driver undetected.

Session 2 PDUs are sent from an endpoint in response to a Session 1 PDU that was successfully verified and decrypted using the local session keys. The Session 2 PDU response contains a signature as well as a SCIP Protocol Header and a SessionInfo header, which contains the responding endpoint's (U1's) corresponding public key, which the opposing endpoint U2 can also use in an analogous manner to generate the shared secret at U2 for IPSec tunnel establishment. Upon completion of the Session 2 PDU, a Diffie-Hellman key agreement is performed, allowing for generation of a shared encryption key useable for IPsec communications that is not actually exchanged, but rather based upon the generated and agreed-upon shared secret. As with Session 0 and Session 1 PDUs, Session 2 PDUs are sent and received on the Stealth UDP port so that they pass through the callout driver undetected, Session 3 PDUs, or keep-alive PDUs (seen in FIGS. 8-16 as "IDLE") are periodically transmitted from a Stealth endpoint as a keep alive on an open IPSec tunnel. Each Session 3 PDU contains the SCIP header, Age, Lifetime and TTL and SessionInfo header. The Session 3 PDU does not contain the user key in the SessionInfo header. This is because the Session 3 PDU is not encrypted—instead, it is sent over the IPSec tunnel. This allows the remote endpoint to detect that a tunnel has terminated without a Session 4 PDU (i.e. due to a network failure) because keep alives are no longer being received. Session 3 PDUs are sent and received on the IPSec tunnel using the IPSec UDP port for Stealth traffic so that they pass through the IPsec tunnel.

Session 4 PDUs, or termination PDUs (seen in FIGS. 8-16 as "TERM"), are sent during orderly termination of an IPsec-based Stealth tunnel. An example of orderly termination is when the Stealth service is disabled via the USSL-Applet 618, or during a user log off. The Session 4 PDU contains a reason code and description to explain the termination reason. The Session 4 PDU is encrypted and signed in the same way as the Session 1 and/or Session 2 PDUs. As with the other PDUs, TERM PDUs are sent and received on the Stealth UDP port so that they pass through the callow driver undetected.

With that background, the various states in state diagram 701) are traversed as follows. Generally, upon receiving an IOCTL or data to be transmitted via a Stealth-enabled connection, the created state 702 is entered, indicating that a connection entry has been initialized for a particular tunnel to be created. Upon sending or receiving a Session 0 PDU, a pending open state 704 is then entered. The endpoint remains in the pending open state 704 if a timeout occurs. If a Session 1 PDU is received, the tunnel is placed on an open state 706. The tunnel then remains in the open state 706 while Session 1 PDUs are received and Session 2 PDUs are sent.

If, while in the pending open state 704 the endpoint sends a Session 1 PDU, the endpoint tunnel enters a pending final state 708, in which it remains through timeouts, or until either (1) a TERM (Session 4) PDU is received, in which case the endpoint tunnel switches to a closed state, or (2) a Session 1 PDU is received with a different SessionID (i.e., a SessionID less than the SessionID regenerated by the local endpoint, to prevent collisions as noted in FIG. 12), or (3) or Session 2 PDU is received, in which the endpoint tunnel changes to the open state 706. If at any time a TERM (Session 4) PDU is received in any state (of states 704-708), the endpoint tunnel enters a closed state 710.

It is noted that in some embodiments, the SessionInfo header may include information regarding IPsec tunnel attributes, which may be intercommunicated between two endpoints. This can, for example, allow the endpoints to negotiate at least a portion of the attributes of a given IPsec tunnel. Example tunnel attributes that may be varied or programmable could include, for example, the specific type of encryption used (e.g., AES-256), a specific authentication mechanism (e.g., SHA-256/AES GCM), whether to use Elliptic Curve cryptography, and the specific IKE version used could all be individually customized for a particular IPsec tunnel. These could be exposed to a user for setting, for example, by using the protocol service 606, which could allow a user or user-level application to set these and additional tunnel attributes. By allowing such tunnel attributes to be changed on a per-tunnel basis, additional flexibility is provided into the system for including computing systems having various IPsec implementations to be integrated (e.g., having different operating system implementations of IPsec, as may be present on Windows, Solaris, Linux, Macintosh, or other types of machines supporting IPsec). This ability to change settings, in particular at the application level (i.e., in user mode 602 at protocol service 606), also allows these machines to be integrated without associating an IPsec-based Stealth appliance with each such "nonstandard" computing system to ensure compliance.

Referring now to FIGS. 8-16, various message flows are shown illustrating different effects of transmission of PDUs and associated data between endpoints, or between an endpoint and an authorization server, to enable IPsec-based Stealth communication tunnels to he created and used As an initial example, FIG. 8 is a message flow diagram 800 illustrating a successful session initialization process, according to an example embodiment of the present disclosure. In the message flow diagram 800 as shown, an initial login/enabling action taken at both endpoints (U1, U2) is followed by a Tunnel INIT IOCTL message at U1. U1 creates encryption key ENC and public validation key VAL, and encrypts ENC and VAL with COI keys present at U1. These keys are added to an AuthToken, which is also signed by VAL. A Session 0 PDU is then transmitted to U2, and a state is updated to the pending open state 704.

At U2, when the Session 0 PDU is received, for each COI and token entry, the token is decrypted with a COI key, and the U1 encryption key and validation key are both imported. U2's encryption key and validation keys are then created, as well as an Elliptic Curve Diffie-Hellman key. A Session 1 PDU is built, and transmitted back to U1.

At U1, upon receiving the Session 1 PDU, the received PDU is decrypted with U1's encryption key, and for every COI in the WGTs, if one can be used to decrypt the AuthToken, the encryption key and validation key of U2 are imported. The AuthToken and Session 1 PDU are validated using the U2 validation key, and U2's Elliptic Curve Diffie-Hellman public key is also imported. A U1 Elliptic Curve Diffie-Hellman key pair is then created, and a shared secret is generated based on sharing of the U1 and U2 ECDH public keys, respectively (once COIs are validated), and an IPsec tunnel is opened. U1 then changes the tunnel state to an open state 706, and generates a Session 2 PDU to be transmitted to U2.

At U2, the Session 2 PDU is decrypted with U2's encryption key, and the Session 2 PDU and validation key are validated. The U1 Diffie-Hellman key is imported, and the same shared secret that was generated at U1 is then generated at U2. U2 then opens an IPsec tunnel, and the state of the tunnel at U2 becomes an open state 706, representing an established IPsec tunnel.

FIG. 9 is a message flow diagram 900 illustrating a failed session initialization process based on a lack of correct encryption/decryption keys, according to an example embodiment of the present disclosure. In the message flow diagram 900, U2 receives the Session 0 PDU from U1, but the COI or validation fails. In this case, U2 simply drops the incoming PDU, and does not send a response (i.e., remains dark to U1). U1 can resend a Session 0 PDU one or more times, until a retry limit is reached, and then enters a closed state 710 if ultimately unsuccessful.

Figure 10:
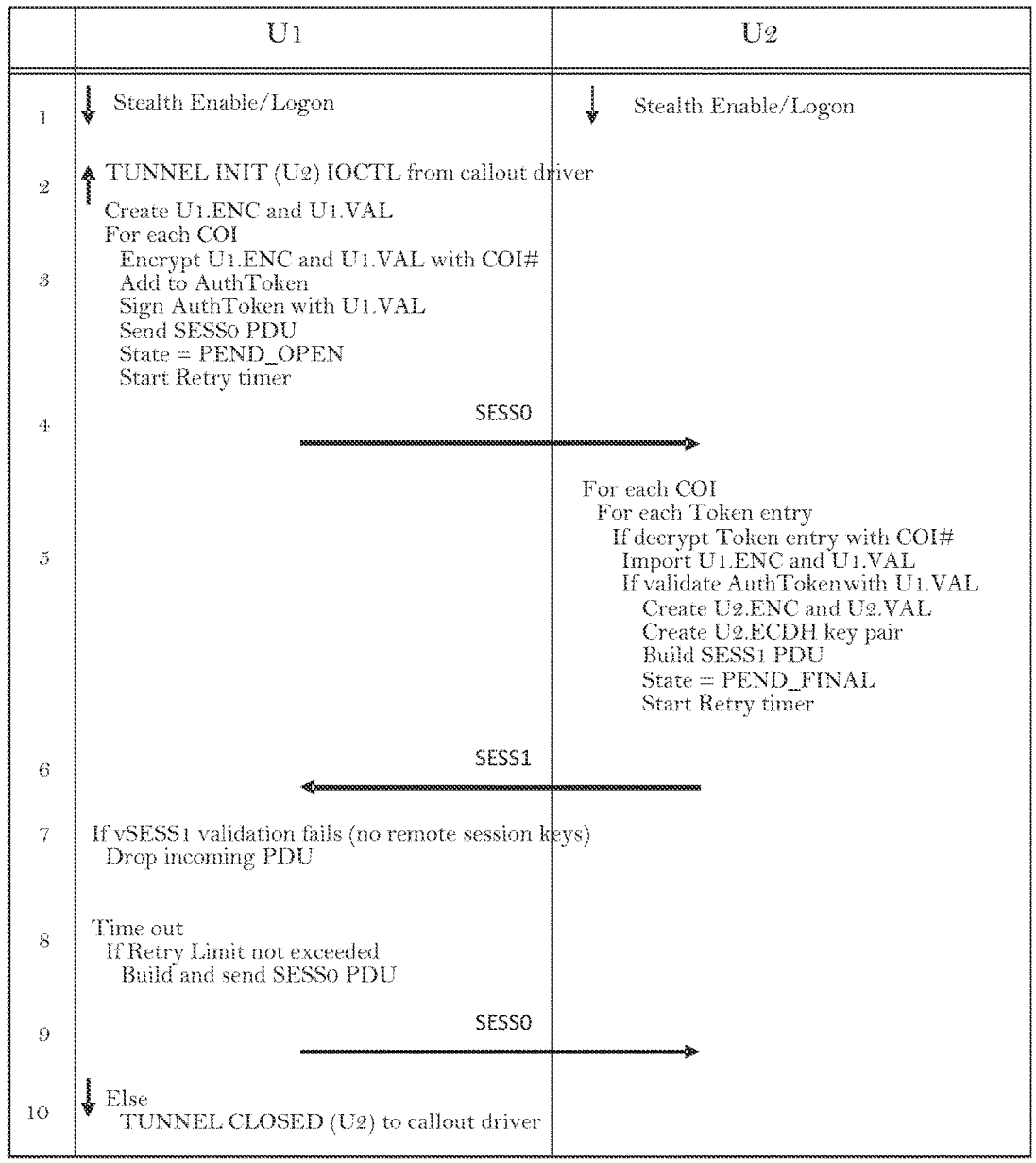
FIG. 10 is a message flow diagram illustrating a failed session initialization process based on a lack of remote session keys, according to an example embodiment of the present disclosure.

FIG. 10 is a message flow diagram 1000 illustrating a failed session initialization process based on a lack of remote session keys, according to an example embodiment of the present disclosure. In this example, U2 has the COI and validation keys that allow it to decrypt the Session 0 PDU; accordingly, it need not remain dark to U1. U2 transmits a Session 1 PDU to U1, which fails to validate the Session 1 PDU since it lacks remote session keys. The incoming PDU is then dropped at U1. U1 can then, as in message flow diagram 900 of FIG. 9, retry a Session 0 PDU to restart opening an IPsec tunnel to U2 if so desired.

Figure 11:
FIG. 11 is a message flow diagram illustrating a failed session initialization process after a tunnel between systems has been established, according to an example embodiment

FIG. 11 is a message flow diagram 1100 illustrating a failed session initialization process after a tunnel between systems has been established, according to an example embodiment. In this arrangement, operation generally proceeds as in message flow diagram 800 until U1 transmits to U2 the Session 2 PDU. At that point, if validation fails, the incoming Session 2 PDU is dropped. U2 transmits a retried Session 1 PDU, or if it has remote session keys, it can send a Session 4 (TERM) PDU to U1 to gracefully close the tunnel between U1 and U2.

FIG. 12 is a message flow diagram 1200 illustrating a session collision, according to an example embodiment. In this arrangement, both U1 and U2 send Session 0 PDUs to each other. Both U1 and U2 would then, if successful in validating those Session 0 PDUs, exchange Session 1 PDUs. If Session 1 PDU validation is successful at each of U1 and U2, the endpoint with the lower SessionID will build and send to the other endpoint the Session 2 PDU to complete the IPsec tunnel opening process.

Figure 13:
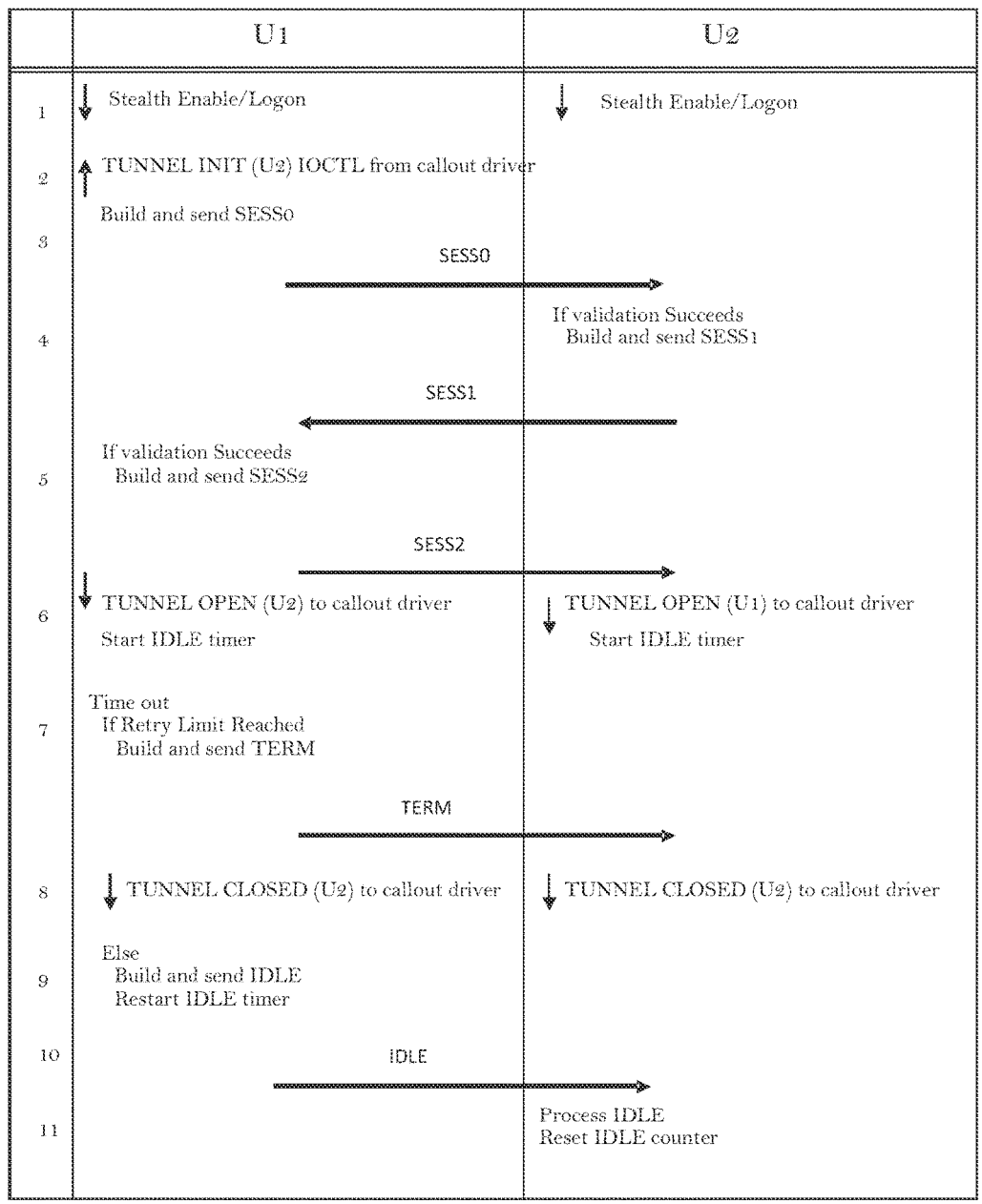
FIG. 13 is a message flow diagram illustrating a session keep-alive event, according to an example embodiment.

FIG. 13 is a message flow diagram 1300 illustrating a session keep-alive event, according to an example embodiment. As seen in FIG. 13, once an open tunnel is established (after the Session 2 PDU is successfully exchanged), an IDLE timer is started at each of U1 and U2. At the end of a timeout period defined by an IDLE timer, U1 will send to U2 a Session 4 (TERM) PDU to close the tunnel; however, if U1 wishes to maintain the tunnel it could send a Session 3 (IDLE) PDU to restart the IDLE timer, maintaining the tunnel in an open state 706.

Figure 14:
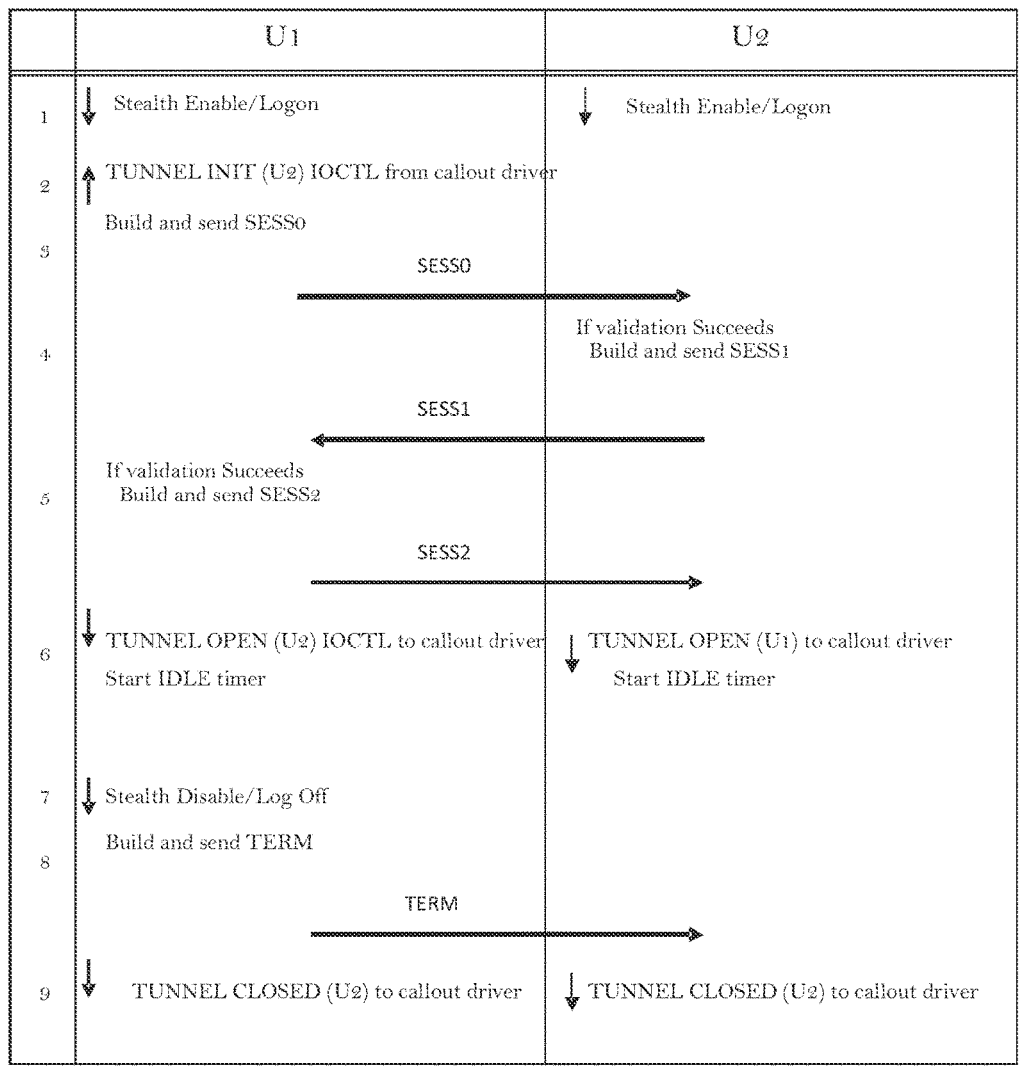
FIG. 14 is a message flow diagram illustrating a session termination, according to an example embodiment.

FIG. 14 is a message flow diagram 1400 illustrating a session termination, according to an example embodiment. In this example, a tunnel is opened, and at U1, a user opts to either disable the Stealth system or logs off the U1 endpoint. At that time, the COI keys become invalid, since the endpoint is no longer associated with a user in that COI. Accordingly, U1 builds and sends a Session 4 (TERM) PDU to close the tunnel, and the tunnel state is changed to a closed state 710.

FIG. 15 is a message flow diagram 1500 illustrating license and logging events in association with an open connection, according to an example embodiment. In this example, U1 is communicating with a Stealth appliance Appl1, which could be, for example, Stealth appliance 210 of FIG. 2, above. To connect to the Stealth appliance, U1 sends an IOCTL to the MLSTPGW driver 416, which initiates an MLSTP license tunnel request to be sent to Appl1. Appl1 transmits a response, opening a license tunnel. The MLSTPGW driver 416 then delivers an IOCTL message to the user level service 406 indicating that the license tunnel is now open (which is a prerequisite to opening of tunnels to peer endpoints), thereby notifying the endpoint that IPsec tunnels can be opened. A logging event message is transmitted to the MLSTPGW driver 416, which builds and sends a Tunnel Open LOG PDU to Appl1, which writes the occurrence of any open tunnels into a system log.

As noted above in connection with FIG. 2, endpoints can also communicate with an authorization service, such as authorization service 211 on server 206, for receiving authorization from that server, and receiving COI keys that are to he distributed among the endpoints. Accordingly, FIG. 16 is a message flow diagram 1600 illustrating a key exchange with an authorization server, according to an example embodiment. In this message flow diagram 1600, the authorization service, represented by AuthServer, delivers COI keys to an endpoint U1 in response to U1 self-identifying to the authorization server. In particular, U1 transmits an HTTP request to AuthServer, which includes transmitting a USSL (RSA1024) public key as a key blob to the AuthServer, which decrypts the request with its private key. Each COI key to be returned to U1 is then wrapped in the USSL public key and returned to U1, which unwraps and imports each COI key, and also transmits to the MLSTPGW driver 416 the COI keys wrapped with a Secure Parser public key generated by the MLSTPGW driver 416. Accordingly, U1 will then have received its COI keys for both IPv4 and IPv6 communications, using either MLSTP or IPsec security constructs.

III. Example Filter Object Structure for IPsec-Based Stealth Communication

Figure 17:
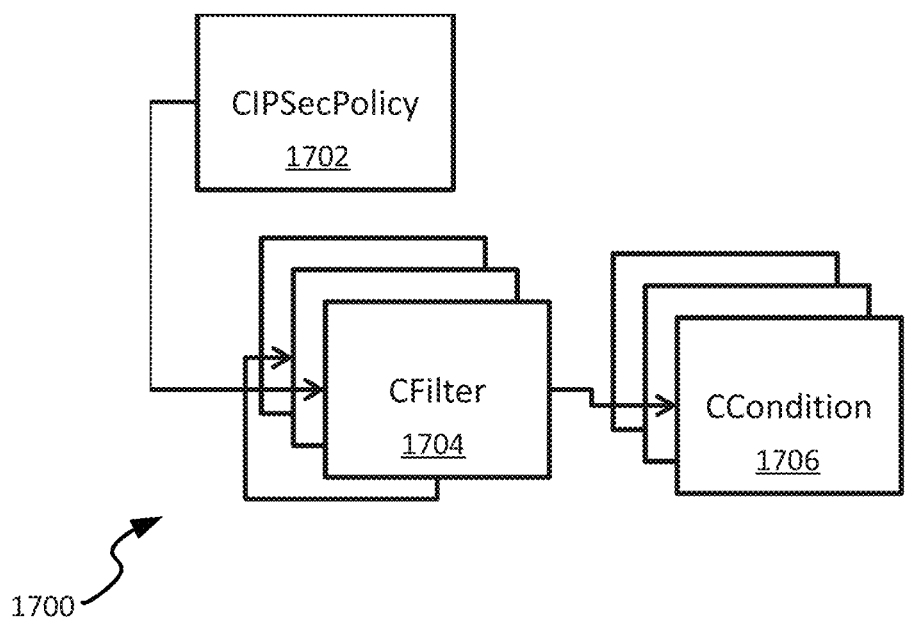
FIG. 17 is a block diagram of global filter objects useable to implement the secured systems and methods of the present disclosure.
Figure 18:
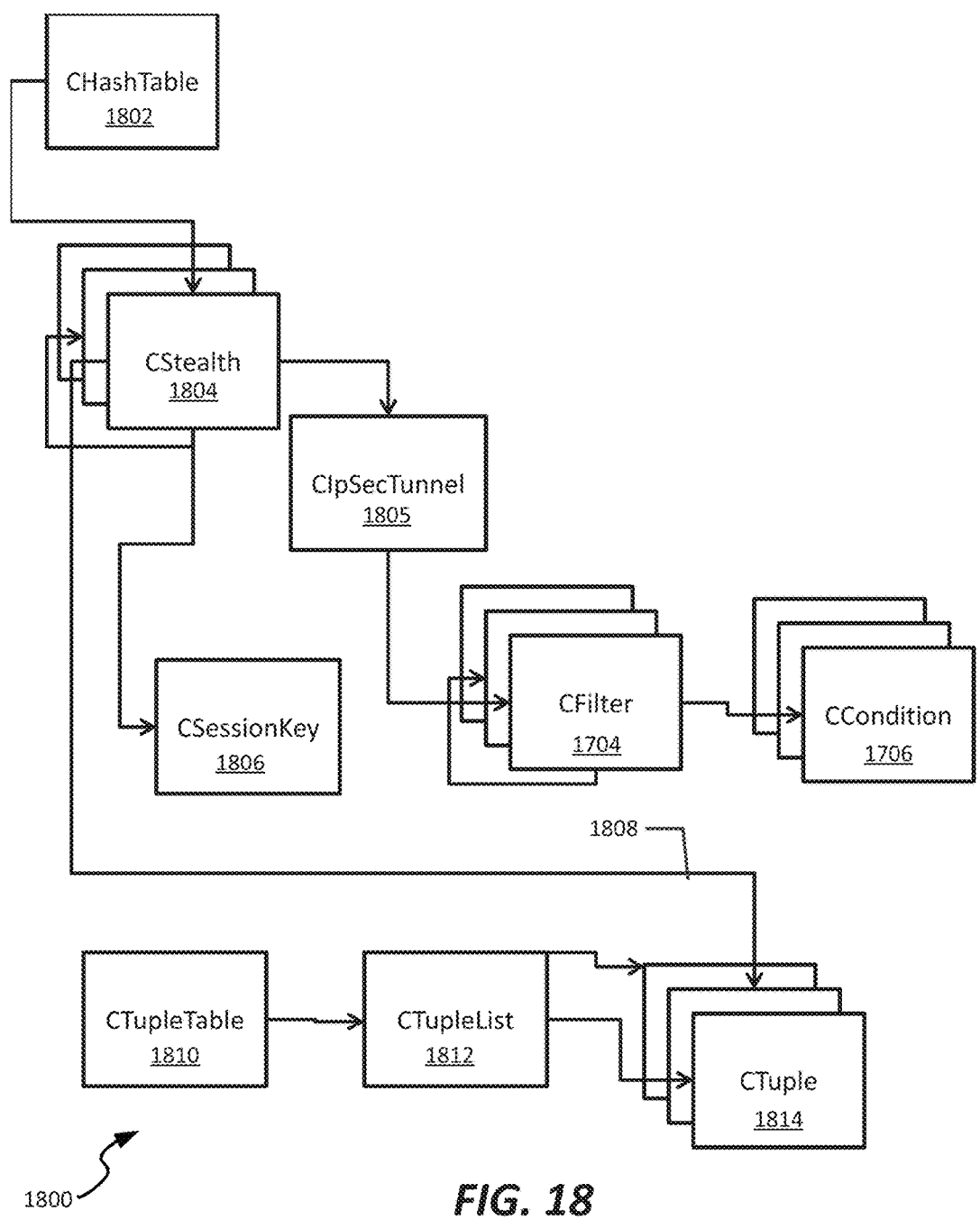
FIG. 18 is a block diagram of secure tunnel filter objects useable to implement the secured systems and methods of the present disclosure.
Figure 19:
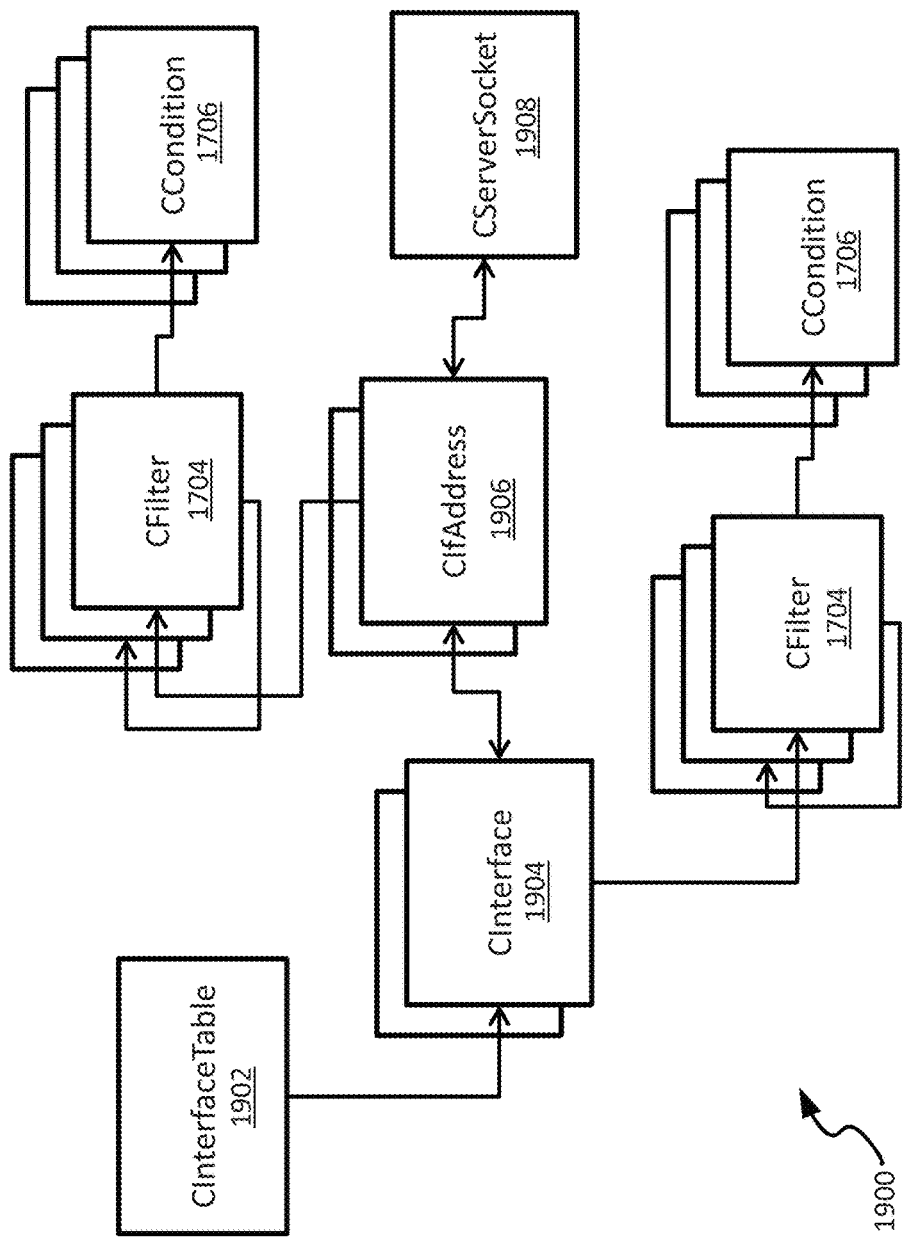
FIG. 19 is a block diagram of interface filter objects useable to implement the secured systems and methods of the present disclosure.

Referring now to FIGS. 17-19, various filter object classes are disclosed that can be used by the IPsec policy manager that can be instantiated and used to manage filters applied at a secured endpoint, for example to manage allowed traffic to/from the endpoint in the base filter engine (e.g., engine 408, 508, and kernel level engine 409). As seen in FIG. 17, a block diagram of an arrangement 1700 of global filter objects is shown, alongside the relationships between the objects used to manage global filters. For example, CIPSecPolicy 1702 contains a plurality of Cfilter instances 1704 (of both IPv4 and IPv6 varieties). Each CFilter instance 1704 can be used to create and manage filters added to the Windows Filtering Engine to enforce the policy for the Stealth tunnel. Each Cfilter instance 1704 points to the next CFilter, as well as its own CConditions 1706. CConditions 1706 corresponds to an array of conditions accessible via a Windows API.

As seen in FIG. 18, an arrangement 1800 of secure tunnel filter objects is illustrated. The use of conditions on IPSec tunnels is limited and does not allow multiple protocols or multiple ports to be defined on an IPSec tunnel. Because of this restriction, the IPSec tunnel contains limited conditions that allow all traffic between the two endpoint of the IPSec tunnel but excludes the session PDUs transmitted using the Stealth port.

In order to deny access to traffic not allowed by a COI filter, the COI filter is used to build blocking filters in the WFP between the two IPSec endpoints. These blocking filters are in some embodiments given a higher weight in the WFP than the IPSec filters so that they are applied to traffic between the two endpoints before the IPSec tunnel filters. This prevents traffic excluded by the COI filter from traversing the IPSec tunnel.

In the embodiment shown, the arrangement 1800 includes a CHashTable 1802, which is the hash table for creating, finding, querying and/or deleting a Stealth tunnel, and contains an array of 4096 hash table buckets. In the embodiment shown, each contains a linked list of CStealth entries 1804. Each CStealth entry 1804 contains a pointer to a CIpSecTunnel instance 1805, which is created from a CStealth entry 1804 and includes a single CIpSecTunnel once it has completed the session exchange. The CIpSecTunnel instance 1805 includes the Security Association for the IPSec tunnel, a linked list of CFilter instances 1704 that describe the IPSec tunnel filters and related COI filters. Each CIPSecTunnel instance 1702 contains a list of Cfilter instances 1704 and associated CConditions 1706. The CStealth entry 1804 also contains a pointer to the CSessionKey 1806 and a CTuple pointer 1808. The CTuple pointer 1808 is used to construct Session 0 PDUs as described above, and contains the last tuple stored in the Session 0 PDU. Once a session exchange has completed successfully, the CTuple pointer 1808 points to the tuple 1814 (i.e., the COI) matched on the remote endpoint.

The CTupleTable 1810 object contains the tuples lists for either the service enclaves or the currently logged on user. The CTupleList 1812 contains the number of tuples in the current list as well as pointers to the first and last CTuple instance 1814 in the list. The first tuple is used to start the processing for Session 0 PDUs and the CTuple pointer 1808 in the CStealth object 1804 is used to pick up with the next tuple when the initial COI token contained the maximum number of COIs. The last tuple is used to add additional information from the XML to the tuple currently being processed in the XML file.

FIG. 19 is a block diagram of an arrangement 1900 of interface filter objects useable to implement the secured systems and methods of the present disclosure. In the embodiment shown, a CInterfaceTable 1902 contains a linked list of CInterface instances 1904. The CInterfaceTable 1902 is used to manage a list of all networking interfaces/adapters on the endpoint. The initial list is created when the Protocol service starts and is updated when notifications are returned by the operating system. The Protocol service registers a callback function during initialization in order to receive add/delete/modify notifications for interfaces/adapters. Each entry in the list represents a networking interface and contains list of unicast IP addresses. Each CIfAddress 1906 contains a pointer to the associated CServerSocket 1908, as well as to a separate CFilter instance 1704 (having a corresponding CCondition 1706). The CServerSocket 1908 points back to the CIfAddress 1906 as well, while the (Interface instances 1904 each also point to a CFilter instance 1704, which also references an array of CConditions 1706.

IV. Summary and Example Applications for IPsec-Based Stealth Communication

Referring to FIGS. 1-19 overall, it is noted that in addition to the above functionality, it is apparent that specific applications may be made available using the IPsec implementation of Stealth as discussed herein. For example, the set of PDU definitions can be extended to provide additional functionality. In some embodiments, an additional set of PDUs could be exchanged between the AuthSvc and endpoint (e.g., endpoint U1) to allow an authorization service to remotely control the endpoint, or at least remotely administer the Stealth-based settings at that endpoint. Additionally, because of the user-level definition of Stealth in the IPsec implementation, additional user applications can be developed to control different aspects of the implementation, such as for VPN associated with particular COIs, or other applications. Further examples can include secured remote access to resources (e.g., storage, applications, virtualized desktops etc.) at a computing system or other endpoint having a common community of interest.

Still referring to FIGS. 1-19 generally, it is noted that the IPsec-based system of the present disclosure presents a number of advantages over both native IPsec and existing Stealth solutions. For example, due to the partially user-mode implementation of the IPsec-based Stealth solution, migration to different IPsec constructs is much simpler. Furthermore, in combination with the feature of configurable IPsec parameters, the present application allows Stealth to be installed on many systems that would be otherwise incompatible with the Stealth solution, while maintaining negotiation capabilities allowing fallback to a proprietary security protocol as needed. Simplified, application level security controls and truly dark endpoints to those entities or persons outside of the community of interest to that person provide still further advantages of the present system.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of establishing secure communications between endpoints, the method comprising:
    transmitting, by a processor of a first endpoint, from the first endpoint to a second endpoint a first message including a token, the token including one or more entries, each entry corresponding to a community of interest associated with a user of the first endpoint and including an encryption key and a validation key associated with the first endpoint and encrypted with the corresponding community of interest key;

receiving, at the processor of the first endpoint, from the second endpoint a second message, distinct from the first message, including a second authorization token at the first endpoint, the second authorization token including one or more entries, each entry corresponding to a community of interest associated with a second user of the second endpoint and including an encryption key and a validation key associated with the second endpoint and encrypted with corresponding community of interest key; for each community of interest associated with both the first user and the second user, decrypting an associated entry in the second authorization token to obtain the encryption key and validation key associated with the second endpoint;

creating, by the processor of the first endpoint, a key pair at the first endpoint and generating a shared secret based on the key pair;

transmitting by the processor of the first endpoint, a third message, distinct from the first and second messages, including the created key pair to the second endpoint, thereby allowing the second endpoint to derive the shared secret;

initializing, by the processor of the first endpoint, a tunnel between the first and second endpoints, the tunnel using the shared secret to derive encryption keys used for IPsec-secured communications between the first and second endpoints.

2. The method of claim 1, wherein the created key pair comprises a Diffie-Hellman key pair.

3. The method of claim 1, wherein the first message comprises a Session 0 Protocol Data Unit (PDU), the second message comprises a Session 1 PDU, and the third message comprises a Session 2 PDU.

4. The method of claim 1, wherein messages passed within the tunnel remain obscured to a third endpoint having a community of interest in common with the first endpoint and the second endpoint.

5. The method of claim 1, wherein the first endpoint has a plurality of states associated with the tunnel, and wherein, prior to transmitting the third message, the first endpoint changes to an open tunnel state.

6. The method of claim 5, wherein prior to receiving the second message, the first endpoint is in a pending open tunnel state.

7. The method of claim 6, further comprising transmitting, by the processor of the first endpoint, a fourth message from the first endpoint to the second endpoint, the fourth message indicating to the second endpoint to close the tunnel.

8. The method of claim 7, wherein after transmitting the fourth message, the first endpoint is in a closed tunnel state.

9. The method of claim 1, further comprising after receiving the second message, importing, by the processor of the first endpoint, the encryption key and the validation key associated with the second endpoint at the first endpoint.

10. The method of claim 1, further comprising, after initializing the tunnel, transmitting, by the processor of the first endpoint, from the first endpoint to the second endpoint one or more keep-alive messages via the tunnel.

11. A method of establishing secure communications between endpoints, the method comprising:

receiving, at a processor of a second endpoint, from a first endpoint at the second endpoint a first message including a token, the token including one or more entries, each entry corresponding to a community of interest associated with a user of the first endpoint and including an encryption key and a validation key associated with the first endpoint and encrypted with the corresponding community of interest key;

for each community of interest associated with both the first user and the second user, decrypting, by the processor of the second endpoint, an associated entry in the first authorization token to obtain the encryption key and validation key associated with the first endpoint;

creating, by the processor of the second endpoint, a key pair at the second endpoint;

transmitting, by the processor of the second endpoint, to the first endpoint from the second endpoint a second message, distinct from the first message, including a second authorization token, the second authorization token including one or more entries, each entry corresponding to a community of interest associated with a second user of the second endpoint and including an encryption key and a validation key associated with the second endpoint and encrypted with the corresponding community of interest key;

receiving at the processor of the second endpoint, at the second endpoint a third message, distinct from the first and second messages, including a key pair created at the first endpoint encrypted with the encryption key of the second endpoint;

deriving, by the processor of the second endpoint, at the second endpoint the shared secret from the key pair created at the first endpoint and the key pair created at the second endpoint; and initializing, by the processor of the second endpoint, a tunnel between the first and second endpoints, the tunnel using the shared secret to derive encryption keys used for IPsec-secured communications between the first and second endpoints.

12. The method of claim 11, wherein the second endpoint has a plurality of states associated with the tunnel, and wherein, after receiving the third message, the second endpoint changes to an open tunnel state.

13. The method of claim 12, wherein after receiving the first message, the second endpoint is in a pending final tunnel state.

14. The method of claim 11, wherein after receiving the fourth message, the second endpoint is in a closed tunnel state.

15. The method of claim 11, wherein users associated with a community of interest are associated with a common community of interest key.

16. The method of claim 11, further comprising, prior to receiving the first message, enabling by the processor of the second endpoint secure communications at the second endpoint.

17. The method of claim 16, further comprising receiving, by the processor of the second endpoint, at the second endpoint community of interest keys associated with the second user from an authorization server.

18. The method of claim 17, further comprising registering, by the processor of the second endpoint, the second endpoint at a security appliance communicatively connected to the second endpoint.

19. The method of claim 18, further comprising logging by the processor of the second endpoint, initialization of the tunnel at the security appliance.

20. A system comprising:
- a first endpoint comprising a non-transitory computer-readable medium comprising instructions which, when executed by a first processor of a computing system of the first endpoint, cause the first processor to perform the steps of:
- transmitting a first message to a second endpoint, the first message including a token, the token including one or more entries, each entry corresponding to a community of interest associated with a user of the first endpoint and including an encryption key and a validation key associated with the first endpoint and encrypted with the corresponding community of interest key;
- receiving from the second endpoint a second message, distinct from the first message, including a second authorization token, the second authorization token including one or more entries, each entry corresponding to a community of interest associated with a second user of the second endpoint and including an encryption key and a validation key associated with the second endpoint and encrypted with the corresponding community of interest key;
- for each community of interest associated with both the first user and the second user, decrypting an associated entry in the second authorization token to obtain the encryption key and validation key associated with the second endpoint;
- creating a key pair and generating a shared secret based on the key pair;
- transmitting a third message, distinct from the first and second messages, including the created key pair to the second endpoint, thereby allowing the second endpoint to derive the shared secret; and
- initializing a tunnel to the second endpoint, the tunnel using the shared secret to derive encryption keys used for IPsec-secured communications by the first endpoint; and
- the second endpoint including a second computing system communicatively connected to the computing system at the first endpoint, the second endpoint comprising a non-transitory computer-readable medium comprising instructions which, when executed by a second processor of the second computing system of the second endpoint, cause the second processor to perform the steps of:
- receiving the first message;
- for each community of interest associated with both the first user and the second user, decrypting an associated entry in the token to obtain the encryption key and validation key associated with the first endpoint;
- creating a second key pair;
- transmitting the second message to the first endpoint, the second message including the second authorization token and the second key pair;
- receiving the third message;
- deriving at the second endpoint the shared secret from the key pair created at the first endpoint and the key pair created at the second endpoint; and
- initializing a tunnel to the first endpoint using the shared secret to derive encryption keys used for IPsec-secured communications by the second endpoint.

* * * * *